(12) United States Patent
Cruz

(10) Patent No.: US 10,083,260 B2
(45) Date of Patent: *Sep. 25, 2018

(54) BOUNDED DOMAIN MODELING WITH SPECIFIED BOUNDARY CONDITIONS AND MASS BALANCING

(71) Applicant: INTERNATIONAL BUSINESS MACHINES CORPORATION, Armonk, NY (US)

(72) Inventor: Ethan E. Cruz, Austin, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 295 days.

This patent is subject to a terminal disclaimer.

(21) Appl. No.: 14/862,250

(22) Filed: Sep. 23, 2015

(65) Prior Publication Data

US 2016/0350460 A1 Dec. 1, 2016

Related U.S. Application Data

(63) Continuation of application No. 14/723,700, filed on May 28, 2015.

(51) Int. Cl.
*G06F 17/50* (2006.01)
*G06F 17/10* (2006.01)
*G06F 17/13* (2006.01)

(52) U.S. Cl.
CPC .......... *G06F 17/5009* (2013.01); *G06F 17/10* (2013.01); *G06F 17/13* (2013.01)

(58) Field of Classification Search
CPC ....... G06F 17/5009; G06F 17/13; G06F 17/10
See application file for complete search history.

(56) References Cited

U.S. PATENT DOCUMENTS 7,048,235 B2 5/2006 McLean et al.
7,239,990 B2 7/2007 Struijs
(Continued)

FOREIGN PATENT DOCUMENTS

GB 2513141 A 10/2014

OTHER PUBLICATIONS

Gilbert, "Validation of Computational Fluid Dynamics Based Data Center Cyber-Physical Models", Thesis, Arizona State University, May 2012 (pp. 19-25) (Year: 2012).*

(Continued)

*Primary Examiner* — Aniss Chad
*Assistant Examiner* — Steven W Crabb
(74) *Attorney, Agent, or Firm* — Tihon Poltavets, Esq.; Kevin P. Radigan, Esq.; Heslin Rothenberg Farley & Mesiti P.C.

(57) ABSTRACT

Computational fluid dynamics modeling of a bounded domain is provided which includes solving iteratively a computational fluid dynamics model of the bounded domain using mass flow boundary conditions that are specified. The solving includes automatically adjusting the specified mass flow boundary conditions for at least one iteration of the solving. The automatically adjusting includes mass balancing flows at a boundary of the bounded domain to provide corrected mass flow boundary conditions for the solving. The mass balancing includes applying different corrections to mass in-flow across the domain boundary, compared with mass out-flow across the boundary. The mass balancing may include multiplying mass in-flows across the boundary by (1−CF), and mass out-flows across the boundary by (1+CF), where CF is a determined correction factor, and net mass flow is positive for mass out-flow exiting the domain, and negative for mass in-flow entering the domain.

9 Claims, 28 Drawing Sheets

(56) References Cited

U.S. PATENT DOCUMENTS

| | | | |
|---|---|---|---|
| 7,921,002 B2 | 4/2011 | Kamatsuchi | |
| 8,315,841 B2 | 11/2012 | Rasmussen et al. | |
| 8,457,939 B2 | 6/2013 | Rodriguez et al. | |
| 8,650,016 B2 | 2/2014 | Lunati et al. | |
| 8,706,461 B1* | 4/2014 | Cary | G06F 17/5018 703/6 |
| 8,744,812 B2 | 6/2014 | Cruz | |
| 8,756,040 B2 | 6/2014 | Cruz | |
| 8,825,451 B2 | 9/2014 | VanGilder et al. | |
| 9,740,801 B2* | 8/2017 | Singh | G06F 17/5004 |
| 2004/0167757 A1 | 8/2004 | Struijs | |
| 2009/0326879 A1 | 12/2009 | Hamann et al. | |
| 2011/0131017 A1 | 6/2011 | Cheng et al. | |
| 2012/0071992 A1 | 3/2012 | VanGilder et al. | |
| 2012/0245903 A1* | 9/2012 | Sturdza | G06F 17/5018 703/2 |
| 2012/0245905 A1 | 9/2012 | Dalgas et al. | |
| 2013/0304430 A1* | 11/2013 | Jolliff | G06F 17/5009 703/2 |
| 2014/0122033 A1* | 5/2014 | VanGilder | G06F 17/5009 703/2 |
| 2014/0297231 A1* | 10/2014 | Georgescu | G06F 17/5009 703/1 |
| 2014/0350899 A1* | 11/2014 | Lu | G06F 17/5009 703/2 |
| 2014/0365186 A1* | 12/2014 | Dubey | G06F 17/5009 703/2 |
| 2015/0066447 A1* | 3/2015 | Lin | G06F 17/5018 703/2 |
| 2015/0347651 A1* | 12/2015 | Barron | G06F 17/5018 703/2 |
| 2016/0350456 A1 | 12/2016 | Cruz | |
| 2016/0350459 A1 | 12/2016 | Cruz | |

OTHER PUBLICATIONS

Mosthaf et al., "A coupling concept for two-phase compositional porous-medium and single-phase compositional free flow", Water Resources Research, vol. 47, (Oct. 21, 2011) (Year: 2011).*

Cruz, Ethan E., Office Action for U.S. Appl. No. 14/862,239, filed Sep. 23, 2015 (U.S. Pat. No. 2016/0350459 A1), dated Aug. 18, 2017 (29 pages).

Cruz, Ethan E., Office Action for U.S. Appl. No. 14/723,684, filed May 28, 2015 (U.S. Pat. No. 2016/0350456 A1), dated Aug. 8, 2017 (36 pages).

Lai et al., "A Domain Decomposition Algorithm for Viscous/Inviscid Coupling", Advances in Engineering Software, vol. 26.2, pp. 151-159 (1996).

Lettieri et al., "Computational and Experimental Validation of a Vortex-Superposition-Based Bouyancy Approximation for the Compact Code in Data Centers", Journal of Electronic Packaging, vol. 135.3, pp. 030903.1-030903.8 (Sep. 2013).

Abdoli et al., "Multi-Objective Design Optimization of Branching, Multifloor, Counterflow Microheat Exchanges", Journal of Heat Transfer, vol. 136.10, pp. 101801.1-101801.10 (Oct. 2014).

Sankar et al., "Three-Dimensional Navier-Stokes/Full-Potential Coupled Analysis for Viscous Transonic Flow", AIAA Journal, vol. 31, No. 10, Oct. 1993 (pp. 1857-1862).

Berkman et al., "Navier-Stokes/Full Potential/Free-Wake Method for Rotor Flows", Journal of Aircraft, vol. 34, No. 3, Sep.-Oct. 1997 (pp. 635-640).

Mavriplis et al., "Accurate Multigrid Solution of the Euler Equations on Unstructured and Adaptive Meshes", IBM Technical Disclosure Bulletin, IP.com No. IPCOM000149411D, Original Publication Date: Unknown, IP.com Electronic Publication: Apr. 13, 2007 (33 pages).

Toulouse et al., "Exploration of Potential-Flow-Based Compact Model of Air-Flow Transport in Data Centers", Proceedings of the ASME 2009 International Mechanical Engineering Congress & Exposition, IMECE2009, Nov. 13-19, 2009 (pp. 41-50).

Toulouse et al., "Experimental Validation of the Compact Code in Data Centers", Proceedings of the ASME 2010 International Mechanical Engineering Congress & Exposition, IMECE2010, Nov. 12-18, 2010 (pp. 1-7).

Cruz et al. "Coupled Inviscid-Viscous Solution Method for Bounded Domains: Application to Data-Center Thermal Management", International Journal of Heat and Mass Transfer (www.elserier.com/locate/ijhmt), Jan. 12, 2015, (pp. 181-194).

Cruz, Ethan E., "CFD Modeling of a Bounded Domain with Viscous Region Partitioning", U.S. Appl. No. 14/723,684, filed May 28, 2015 (95 pages).

Cruz, Ethan E., "Bounded Domain Modeling with Specified Boundary Conditions and Mass Balancing", U.S. Appl. No. 14/723,700, filed May 28, 2015 (90 pages).

Cruz, Ethan E., "CFD Modeling of a Bounded Domain with Viscous Region Partitioning", U.S. Appl. No. 14/862,239, filed Sep. 23, 2015 (88 pages).

Cruz, Ethan E., "List of IBM Patents or Patent Applications Treated as Related" for U.S. Appl. No. 14/862,250, filed and dated Sep. 23, 2015 (2 pages).

* cited by examiner

FIXED FLOW VISCOUS BOUNDRY CONDITIONS

| FACE | ORIGINAL BOUNDARY CONDITIONS | | | | CORRECTED BOUNDARY CONDITIONS USING SOURCE / APPLIED CF | | | CORRECTED BOUNDARY CONDITIONS USING ENHANCED MASS BALANCE APPROACH | | |
|---|---|---|---|---|---|---|---|---|---|---|
| | NORMAL | | VECTOR | | NEW VECTOR | | NEW FLUX | NEW VECTOR | | NEW FLUX |
| | x | y | x | y | FLUX | x | y | | x | y | |
| 11 | 1 | 0 | 1 | 0.5 | 1 | 0.9524 | 0.4762 | 0.9524 | 0.9630 | 0.5000 | 0.9630 |
| 12 | 1 | 0 | 0 | 1 | 0 | 0.0000 | 0.9524 | 0.0000 | 0.0000 | 1.0000 | 0.0000 |
| 13 | 1 | 0 | -0.5 | 1 | -.5 | -0.4762 | 0.9524 | -0.4762 | -0.5185 | 1.0000 | -0.5185 |
| 14 | 1 | 0 | -1 | 0 | -1 | -0.9524 | 0.0000 | -0.9524 | -1.0370 | 0.0000 | -1.0370 |

PERFORM THE INVISCID DOMAIN SOLVE USING THE SET OF INVISCID EQUATIONS AND A MULTI-GRID METHOD (V OR W OR FMG METHOD) ON THE MEDIUM MULTI-GRID MESH (GRIDS 7 - 9) — 1600

# BOUNDED DOMAIN MODELING WITH SPECIFIED BOUNDARY CONDITIONS AND MASS BALANCING

STATEMENT REGARDING PRIOR DISCLOSURE BY THE INVENTOR OR A JOINT INVENTOR

The following disclosure is submitted under 35 U.S.C. § 102(b)(1)(A): "Coupled Inviscid-Viscous Solution Method for Bounded Domains: Application to Data-Center Thermal Management", E. Cruz et al., publically available Feb. 13, 2015, in International Journal of Heat and Mass Transfer.

BACKGROUND

The heat dissipated by today's computing equipment is reaching levels that make it challenging to cool the computing equipment in densely-packed data centers. In data centers, the computing equipment, such as a multitude of computer servers, are commonly placed in a series of racks arranged in one or more rows in the data center. Typically, the data center has a cooling system that includes, by way of example, one or more air-conditioning units. The one or more air-conditioning units provide cooled air to the electronics racks via, for example, a sub-floor or overhead plenum and associated perforated tiles or diffusers. Without a proper layout of the data center, costly inefficiencies in the cooling system inevitably occur, possibly resulting in insufficient cooling of the electronics racks.

Airflow distributions within the data center significantly impact the thermal environment of the equipment within the data center. Computational fluid dynamics (CFD) calculations have been used to solve the Navier-Stokes (NS) equations, and the modeling results of the NS-CFD have been employed to thermally manage data centers. There can be, however, several potential problems with NS-CFD modeling of a data center. For example, while NS-CFD modeling has been successfully deployed for the design of very well-defined structures, such as airplane wings, the application of NS-CFD modeling to data centers can be somewhat problematic. Every data center design is different. For example, heterogeneous technology (such as computer equipment from different vendors and/or of different versions) may be used within a given data center; available data (e.g., nameplate, power and flow data) may not reflect actual usage data; and, airflow is very difficult and time-consuming to accurately measure and characterize (and may not capture room effects, such as drafts).

Additionally, the NS-CFD calculations involved are time-consuming, and may take days in order to arrive at a reasonably accurate solution, using fine grids of the data center. Because of the time-consuming nature of existing NS-CFD models, their application in optimizing a data center layout, and cooling system for the data center, is limited.

BRIEF SUMMARY

The shortcomings of the prior art are overcome and additional advantages are provided through the provision of a method which includes: performing computational fluid dynamics modeling of a bounded domain. The performing includes, for instance: solving iteratively a computational fluid dynamics model of the bounded domain using mass flow boundary conditions that are specified, the solving comprising automatically adjusting the mass flow boundary conditions for at least one iteration of the solving, the automatically adjusting comprising mass balancing flows at a boundary of the bounded domain, wherein the mass balancing comprises applying different corrections to mass in-flows across the boundary into the bounded domain compared with mass out-flows across the boundary from the bounded domain.

Additional features and advantages are realized through the techniques of the present invention. Other embodiments and aspects of the invention are described in detail herein and are considered a part of the claimed invention.

BRIEF DESCRIPTION OF THE SEVERAL VIEWS OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

DETAILED DESCRIPTION

Computational fluid dynamics and heat transfer (CFD/HT) models may be used in the design and optimization of both new and existing data centers, as well as other bounded domains. Inviscid modeling has shown good speed advantages over the full Navier-Stokes CFD/HT models (over 20 times faster), but is incapable of capturing the physics of the viscous regions of the domain. A coupled inviscid-viscous solution method (CIVSM) or hybrid CFD/HT method for bounded domains is disclosed herein which increases both the solution speed and the accuracy of the CFD/HT model. The methodology includes an iterative solution technique that divides the full domain into multiple regions comprising, for instance, a set of viscous, inviscid and interface regions. The full steady, Reynolds-averaged Navier-Stokes equations with turbulence modeling may then be used to solve the viscous domain, while the inviscid domain may be solved using, for instance, potential flow equations or Euler equations. Once solved, the results of the viscous domain solve and the inviscid domain solve are assembled into a model of the bounded domain. By combining the increased speed of the inviscid solver in the inviscid regions, along with the viscous solver's ability to capture the turbulent flow physics in the viscous regions, a faster and more accurate solution may be obtained for bounded domains that contain large inviscid regions, such as data centers.

Figure 1:
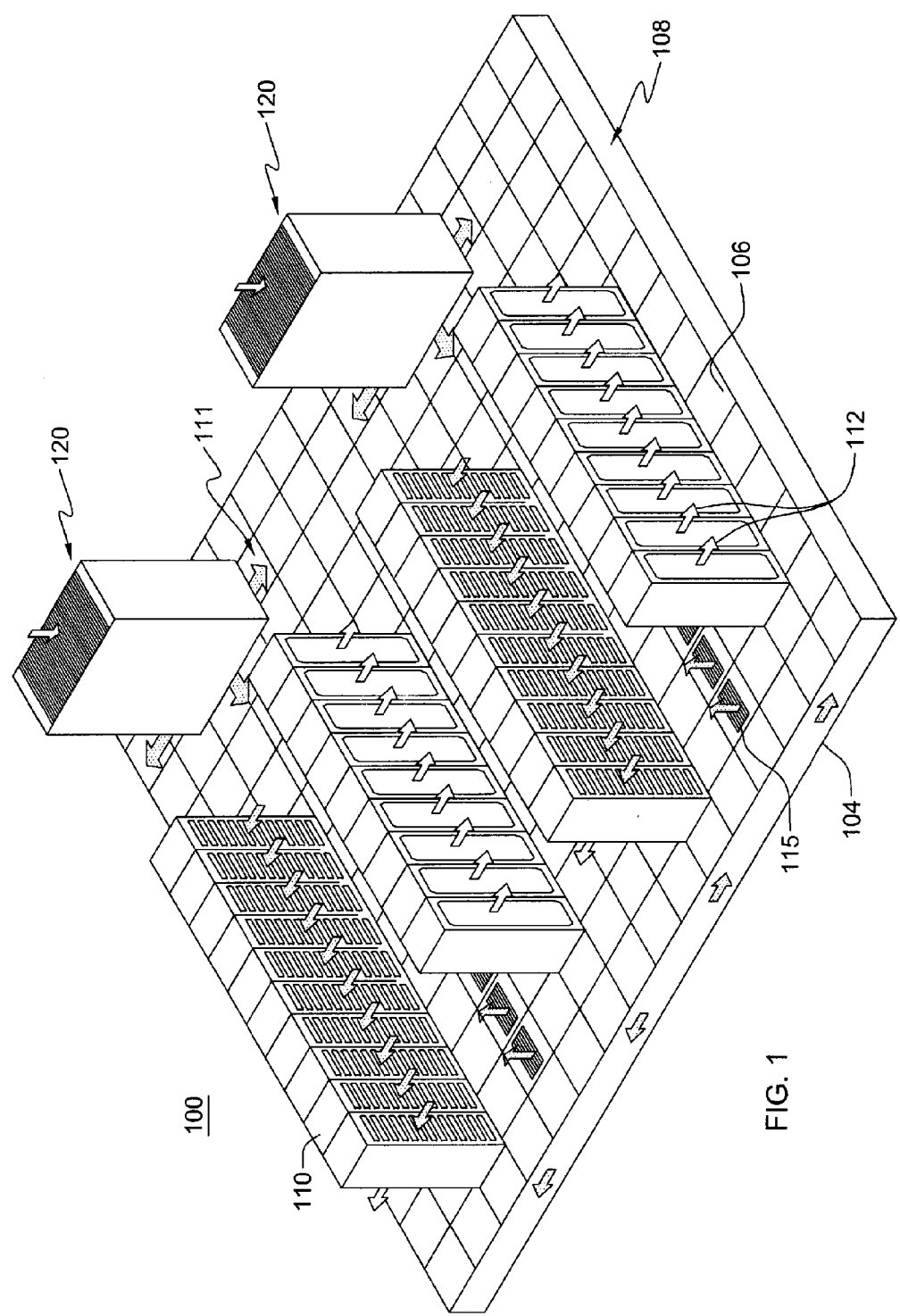
FIG. 1 depicts one example of a data center to be modeled using computational fluid dynamics modeling, in accordance with one or more aspects of the present invention.

FIG. 1 depicts one embodiment of a data center 100, which in one example, is a raised floor layout of an air-cooled computer installation or data center 100. Data center 100 includes electronics (or information technology (IT)) racks 110 disposed in one or more rows on a raised floor 106 of data center 100. One or more air-conditioning units 120 (also referred to as computer room air-conditioners (CRACs)) take in hot air (for example, through one or more air inlet vents in the top of the CRACs) and exhaust cooled air into a sub-floor plenum 108 below raised floor 106. Hot airflow through data center 100 is depicted by light arrows 112, and cooled airflow through data center 100 is indicated by stippled arrows 111.

In FIG. 1, electronics racks 110 employ a front-to-back cooling approach. Namely, according to this approach, cooled air 111 is drawn in through a front (air inlet side) of each rack, and hot air 112 is exhausted from a back (air outlet side) of each rack. The cooled air drawn into the front of the rack is supplied to air inlets of the electronic components (e.g., servers) disposed within the IT racks. Space between raised floor 106 and a sub-floor 104 defines the sub-floor plenum 108. Sub-floor plenum 108 serves as a conduit to transport, for example, cooled air 111 from the air-conditioning units 120 to the electronics racks. In one embodiment, racks 110 are arranged in a hot aisle/cold aisle configuration, with their air inlet sides and air outlet sides disposed in alternating directions, as illustrated in FIG. 1. Cooled air 111 is provided through one or more perforated floor tiles 115 in raised floor 106 from sub-floor plenum 108 into the cold aisles of the data center. The cooled air 111 is then drawn into electronics rack 110, via their inlets, and subsequently exhausted into the data center via one or more air outlets of the individual electronics racks into the hot aisles of the data center.

The air-conditioning units 120 may receive chilled water from a refrigeration chiller plant (not shown). Each air-conditioning unit includes a blower motor to circulate air through the air-conditioning unit, and to provide the cooled air 111 to the sub-floor plenum 108.

The pervasive trend of increasing heat flux and power dissipation of information technology (IT) equipment, has created a significant challenge for air cooled data center facilities, which can contain as many as several thousand pieces of IT equipment. In order to maintain high reliability, adequate air cooling needs to be provided according to manufacturer's specifications. As power dissipation increases, so does cooling requirements, necessitating higher IT equipment and cooling supply air flow rates. This can lead to complex flow patterns and temperature distributions within a data center. In order to better understand the data center air flow and reduce mixing of hot and cold air streams, which degrades cooling efficiency, computational fluid dynamics and heat transfer (CFD/HT) modeling may be employed in the design and optimization of the data center. As much as 1.5% of the world's and 2.2% of the United States' electrical power is currently consumed by data centers, and roughly half of that is used for cooling. Thus, optimizing data center cooling systems to minimize power consumption is an industry imperative.

A number of researchers have used the standard k-ε turbulence model to simulate data centers using HFD/HT Reynolds-averaged Navier-Stokes (RANS) solvers. It has become the most commonly used turbulence model in data center analysis, although it is neither proven to be most accurate, nor the most computationally efficient. In order to increase computational efficiency, reduced order modeling techniques have been used, such as ad hoc methods, Proper Orthogonal Decomposition (POD), and various inviscid and potential flow methods. In general, these methods increase computational efficiency relative to traditional CFD/HT RANS modeling methods, but at the cost of modeling accuracy.

Inviscid and potential flow reduced modeling techniques are most similar to full Navier-Stokes CFD/HT models and in some cases are simply a subset of the same equations. The inviscid equations (or Euler equations) are a subset of the full Navier-Stokes equations with the elimination of the viscous terms. The potential flow models add the requirement that the flow is not only inviscid but also irrotational. Both of these simplified modeling techniques allow for significantly smaller grid counts and therefore faster solution times, but don't necessarily capture all the physics in a complex, turbulent flow field.

Figure 2:
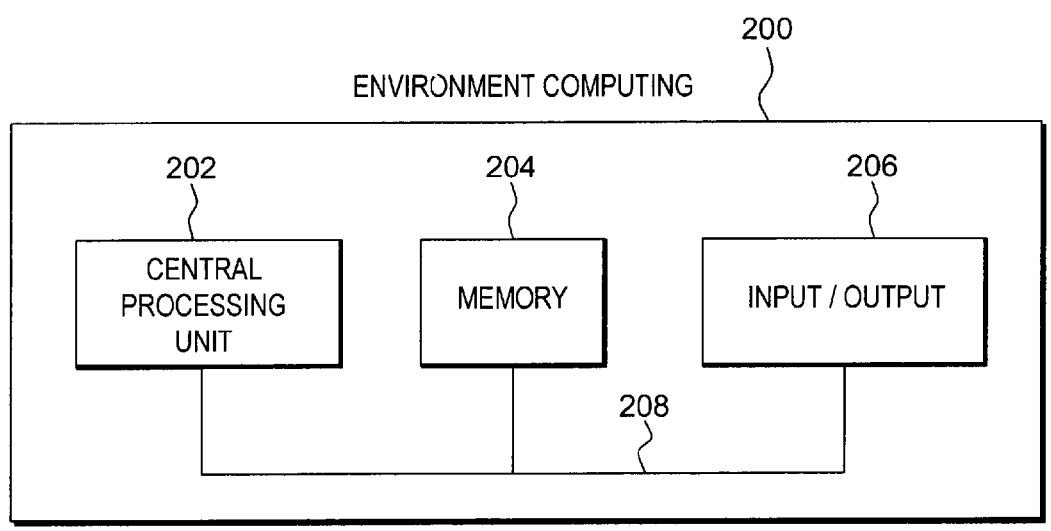
FIG. 2 depicts one embodiment of a computer system to implement computational fluid dynamics modeling of a bounded domain, in accordance with one or more aspects of the present invention.

The coupled inviscid-viscous solution method (CIVSM) (or hybrid CFD method) disclosed herein for subsonic flow in a bounded domain, such as a data center, provides superior performance over the above-noted approaches and may be implemented in a wide variety of computing environments. FIG. 2 depicts, by way of example only, one embodiment of a computing environment (or system) 200 which may be employed in the computation of these models.

Computing environment 200 comprises, for instance, one or more processors (CPUs) 202, one or more of which may execute an operating system, such as the z/OS® operating system, offered by International Business Machines Corporation, Armonk, N.Y., USA, memory 204, and one or more input/output (I/O) devices/interfaces 206, coupled to one another via one or more buses 208. As one example, the computing environment may comprise one or more computer systems, each of which may include one or more components such as illustrated in FIG. 2, and each computer system may have the same or different components than another computer system.

For example, in another embodiment, a computer system to implement the computational fluid dynamics modeling approach disclosed herein, may comprise one or more processors, a network interface, a memory, a media interface and an optional display. The network interface allows the computer system to connect to a network, while the media interface allows the computer system to interact with media, such as a hard drive or removable media.

As explained further below, the methods disclosed herein may be distributed as an article of manufacture that itself comprises a machine-readable medium containing one or more programs, which when executing, implement embodiments of the present invention. For instance, the machine-readable medium may contain a program configured to divide the bounded domain into at least one viscous region and at least one inviscid region; perform viscous domain solve for the at least one viscous region using a turbulence model; perform inviscid domain solve for the at least one inviscid region using a set of inviscid equations; and provide results of the viscous domain solve and the inviscid domain solve as a CFD/HT model of the bounded domain.

The machine-readable medium may comprise a recordable medium (e.g., floppy disk, hard drive, optical disk, memory cards, etc.) or may comprise a transmission medium (e.g., a network comprising fiber optics, the worldwide web, cables, or a wireless channel using time-division multiple access, code-division multiple access, or other radio-frequency channel). Any tangible medium known or developed that can store information suitable for use with a computer system may be used. In one embodiment, the machine-readable medium comprises a non-transitory, computer-readable storage device.

The processor can be configured to implement the methods, steps and functions disclosed herein. The memory can be distributed or local, and the processor can be distributed or singular. The tangible memory could be implemented as an electrical, magnetic or optical memory device, or any combination of these or other types of non-transitory storage devices. Moreover, the term "memory" should be construed broadly enough to encompass any information able to be read from, or written to, an address in an addressable space accessible by the processor. With this definition, information on a network, accessible through the network interface, is within the memory because the processor can retrieve the information from the network. It should be noted that each distributed processor that makes up the one or more processors generally contains its own addressable memory space. It should also be noted that some or all of the computer system or computing environment can be incorporated into an application specific or general-use integrated circuit.

As noted, computational fluid dynamics (CFD) methodologies using the Navier-Stokes (NS) equations may be used to predict the airflow and temperature fields within a data center model, or more generally, a bounded domain model. With one common approach, data center thermal and airflow modeling involves solving Navier-Stokes (NS) equations using intensive computational fluid dynamics calculations, which can comprise as many as five coupled (non-linear) partial differential equations (one for conservation of mass, three for momentum conservation, and one for conservation of energy). Using a description of the fluid or gas (such as the ideal gas law which relates pressure p and temperature T), there are six equations for six unknowns ($p, v_x, v_y, v_z, T, \rho$) with four variables, x, y, z, t (see below). In order to solve these equations, Navier-Stokes computational fluid dynamics (NS-CFD) simulations are typically used, i.e., CFD is used to obtain numerical solutions.

Using the Reynolds decomposition of the variables for a homogeneous, incompressible fluid (i.e. $d\rho=0$) with gravitational body force, and neglecting the pressure work, the kinetic energy terms, and the dissipative heating terms due to viscous stresses, the averaged continuity, momentum, and energy equations can be written in tensor notation and in Cartesian coordinates as:

$$\frac{\partial}{\partial x_i}(\bar{u}_i) = 0 \qquad (1)$$

$$\rho\frac{\partial}{\partial t}(\bar{u}_i) + \rho\frac{\partial}{\partial x_j}(\bar{u}_i\bar{u}_j) = \qquad (2)$$
$$-\frac{\partial}{\partial x_i}(\bar{p}) + \frac{\partial}{\partial x_j}\left\{\mu\left[\frac{\partial}{\partial x_j}(\bar{u}_i) + \frac{\partial}{\partial x_i}(\bar{u}_j)\right] - \rho\overline{u'_iu'_j}\right\} + \rho g_i$$

$$\frac{\partial}{\partial t}(\bar{T}) + \frac{\partial}{\partial x_i}(\bar{u}_i\bar{T}) = \frac{\partial}{\partial x_j}\left[\frac{k}{\rho c_p}\frac{\partial}{\partial x_j}(\bar{T})\right] + S - \frac{\partial}{\partial x_i}(\overline{u'_iT'}) \qquad (3)$$

$$\rho(p,T) = \frac{Mp}{RT} \qquad (4)$$

where $\rho$ is the density, $\bar{u}_i$ the mean (time averaged) velocity vector from the Reynolds decomposition, $u_i'$ the fluctuating velocity vector from the Reynolds decomposition, p the static pressure, $\mu$ the molecular viscosity, $\rho g_i$ the gravitational body force per unit volume, T the static absolute temperature, k the thermal conductivity, $c_p$ the specific heat, and S the volumetric heat sources. The Reynolds stresses, along with the additional temperature transport terms, require additional relations or models in order to close the set of equations.

According to one approach, three-dimensional thermal distribution and airflow measurements may be used in the NS-CFD calculations to provide a temperature and airflow model for the data center. The creation of a NS-CFD model using measurements is described, for example, in commonly assigned, U.S. Patent Publication No. 2009/0326879 A1, entitled "Techniques for Thermal Modeling of Data Centers to Improve Energy Efficiency".

Figure 3:
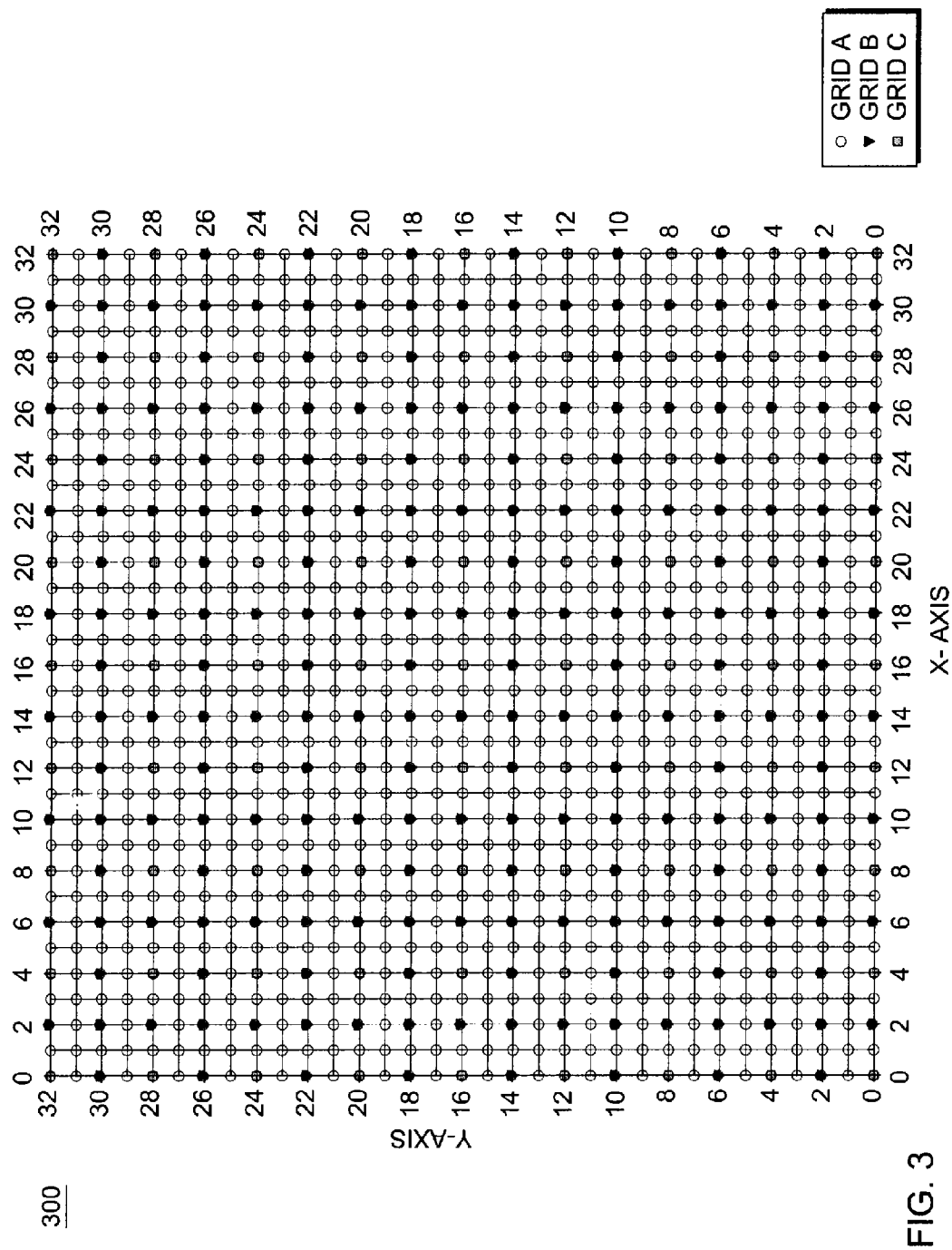
FIG. 3 depicts a conventional, 2-D fine multi-grid mesh of a solution domain used in capturing flow physics employing full Navier-Stokes equations and a computational fluid dynamics (CFD) model with turbulence equations, in accordance with one or more aspects of the present invention.

In order to speed computation of these models, a multi-grid method may be employed. FIG. 3 illustrates one embodiment of a bounded domain 300 comprising a fine multi-grid mesh, which may be employed in CFD modeling of a bounded domain. Using the CFD methodology with NS equations and the relatively fine grids of a multi-grid such as depicted in FIG. 3, however, can take days in order to arrive at a reasonably accurate solution.

Faster solutions are desired to facilitate more data center layouts and scenarios being run and evaluated. This would enable the identification of inefficiencies and weaknesses in a data center layout, and allow for optimization of the data center layout for (for example) energy efficiency. This could in turn increase data center processing equipment reliability by reducing inlet air temperatures. Faster solutions would also permit transient analysis within the data center, allowing failure analysis to be performed on various pieces of equipment, and the fault tolerance of different designs to be evaluated. Faster solutions would also allow analysis of where recirculation within the data center is most likely to occur, and explore options (such as rack placement) that can be implemented to reduce entropy-generation (i.e., cold and hot air mixing), as well as locate localized hot spots within the data center.

Faster approaches which retain accuracy have been proposed (reduced order modeling techniques), but tend to rely on statistical analysis and interpolation of other CFD models. These models have proven to speed computation for specific cases, but must be built for certain arrangements and conditions that are not universally applicable. They require a database of previous solutions to work from, which takes time to build, and resources to maintain.

As an alternative approach, certain assumptions can be made about conditions in the data center. For example, it might be assumed that there is no turbulence, constant density, free slipping over boundaries (slipless), and viscous forces are much less than inertial forces (i.e., viscous forces can be neglected). By way of these assumptions, the Navier-Stokes equations (shown above) can be simplified.

The above approximations simplify the NS-CFD equations to the Euler equations:

$$\frac{\partial}{\partial x_i}(u_i) = 0 \quad (5)$$

$$\rho\frac{\partial}{\partial t}(u_i) + \rho\frac{\partial}{\partial x_j}(u_i u_j) = -\frac{\partial}{\partial x_i}(p) + \rho g_i \quad (6)$$

$$\rho\frac{\partial}{\partial t}(E) + \frac{\partial}{\partial x_i}[u_i(E+p)] = S \quad (7)$$

where E is the sum of the internal and kinetic energy:

$$E = h - \frac{p}{\rho} + \frac{u^2}{2} \quad (8)$$

where h is the sensible enthalpy defined by:

$$h = \int c_p dT \quad (9)$$

The Equations (1)-(9) above cannot be solved without applying the correct boundaries. Various, measurement manufacturers' data and/or modeling techniques may be employed to supply these boundaries, which are fed into the model. For example, the input and output of the CRACs (or the output of the perforated tiles) are sources, and the air returns to the CRACs can be sinks, while the racks are sinks at the inlet(s), and sources at the outlet(s).

In order to solve Equation (2), an absolute value for the pressure has to be set somewhere in the data center. In some cases, it may be desirable to set the pressure at the air returns of the CRACs. All of the source and sink flow boundaries can be taken directly from the equipment manufacturers' data or can be obtained directly from measurements to define the "flow boundaries" of the Equations. Outer parts of the modeling domain, such as the data center walls and ceiling, have natural boundaries, as is commonly applied in partial differential equation problems.

In general, with any of the data center models described herein, the inputs can include, but are not limited to, the rack heat loads (i.e., power dissipated by the IT racks, which is equal to the power consumed by the racks to perform computational work) and (inlet/outlet) airflow rates, the CRAC's heat removal rate, supply temperature and airflow rates (which is equivalent to supplied cool airflow rate or return hot air rate), as well as several other miscellaneous parameters. These miscellaneous parameters can include, but are not limited to, tile perimeter leakage flow rates, location of cable openings (which can serve as air passages, e.g., into-out of the racks/the data center), the perforated tile airflow rates and temperature, and/or direction of CRAC's airflow.

Although employing the Euler equations (i.e., a set of inviscid equations) results in a faster modeling of the bounded domain, significant accuracy can be lost by ignoring turbulence within the bounded domain. Thus, disclosed hereinbelow with reference to FIGS. 4-21 is the concept of solving the CFD model in multiple regions using different modeling techniques for the different regions of the bounded domain based on flow physics. The entire bounded domain model is broken into a number of regions that are solved separately using appropriate equations, as explained further below. Two principle categories of regions are the viscous regions and the inviscid regions. Between these regions is defined an interface region, which allows the viscous and inviscid regions to transfer flow physics back and forth during the modeling. The inviscid equations are much simpler (and hence faster to solve) than the viscous equations, and these regions can take up the majority of the space in a data center. The inviscid equations also allow for coarser meshes than the viscous equations for the same accuracy in the solution, which further increases the solver's speed. By solving the inviscid equations instead of the viscous equations (as is conventionally done today) in these regions, faster solutions are obtained with virtually no loss of accuracy. The use of multiple regions also allows for different turbulence models to be employed in different viscous regions of the data center. This allows for not only faster computation, but more accurate results in the viscous regions.

By way of explanation (and example), the following terms are employed herein:

Set of inviscid equations—(a/k/a Euler Equations): A subset of the Navier-Stokes Equations with no viscosity.

Inviscid region—A region in the domain where the inviscid equations are used to solve for the flow and temperature fields.

Viscous region—A region in the domain where the full Navier-Stokes Equations are used to solve for the flow and temperature fields.

Interface region—An overlap region that serves to separate the inviscid and viscous regions, which also applies the boundary conditions for the two solvers and their different grids.

Turbulence Threshold Criteria—The criteria used, in one or more embodiments, to define the location of the interface region which separates the inviscid and viscous regions.

Multi-Grid (MG) Method of solving the governing equations on multiple grid levels in order to reduce convergence time. This is accomplished by reducing the global (low frequency) errors in the solution by solving on coarser grid levels, since the solver effectively reduces only the local (high frequency) error on each grid level.

Figure 4:
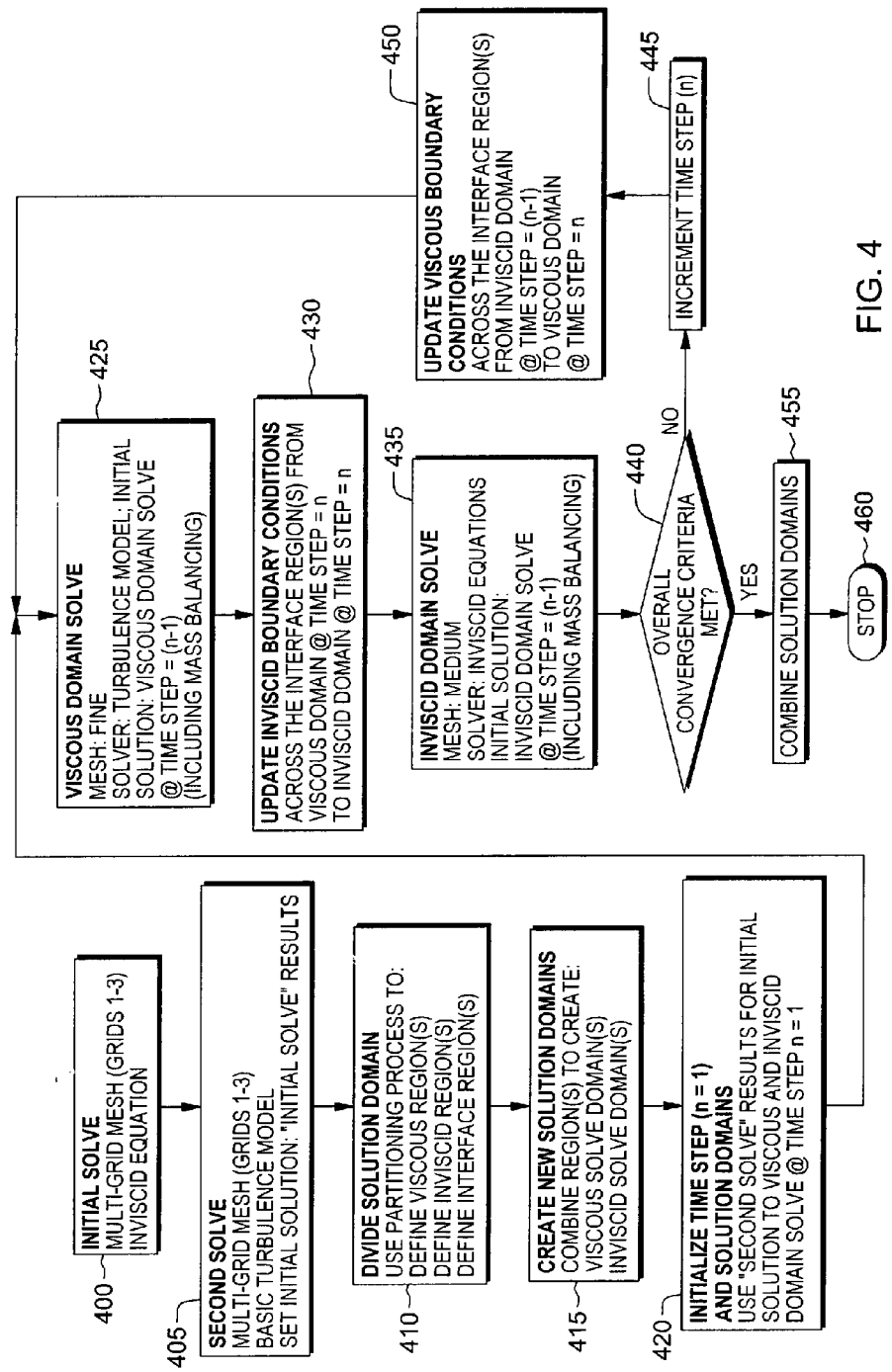
FIG. 4 depicts one embodiment of an approach for computational fluid dynamics modeling of a bounded domain, in accordance with one or more aspects of the present invention.

FIG. 4 is an overview of one embodiment of a coupled inviscid-viscous solution method (CIVSM) or hybrid computational fluid dynamics modeling approach for a subsonic flow in a bounded domain, in accordance with one or more aspects of the present invention. In the depicted embodiment, after a CFD/HT model is created with the appropriate boundary conditions, processing begins by initially solving (or modeling) the bounded domain using a set of inviscid equations, and (in one approach) a multi-grid mesh 400.

Figure 5A:
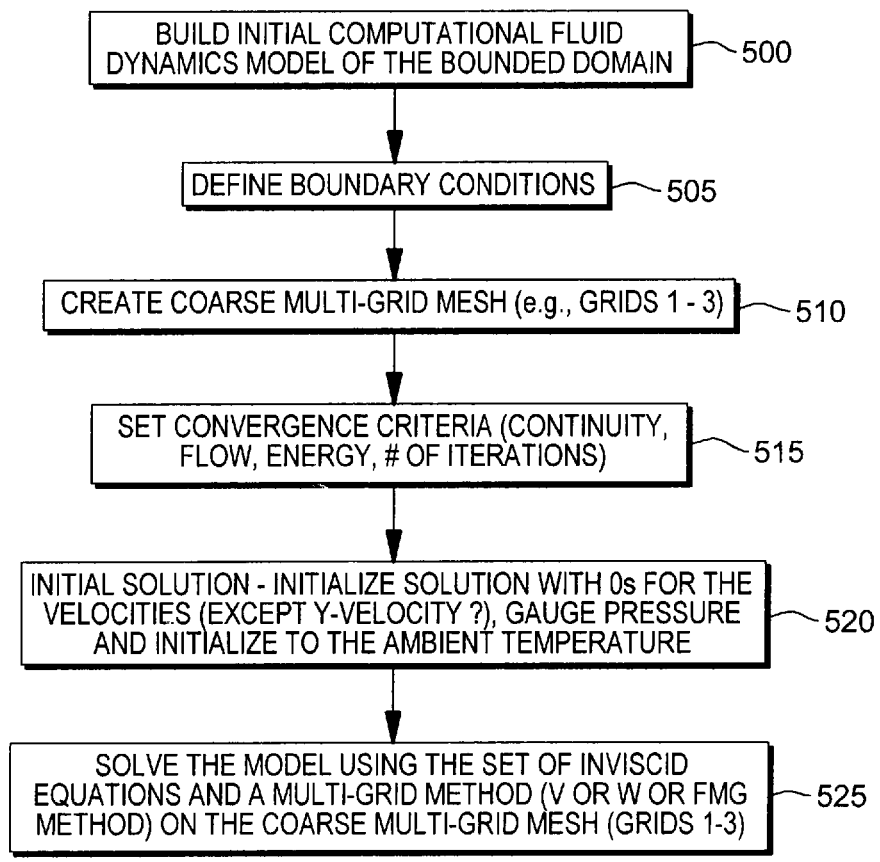
FIG. 5A depicts one embodiment of an initial solve process for the computational fluid dynamics modeling approach of FIG. 4, in accordance with one or more aspects of the present invention.
Figure 5B:
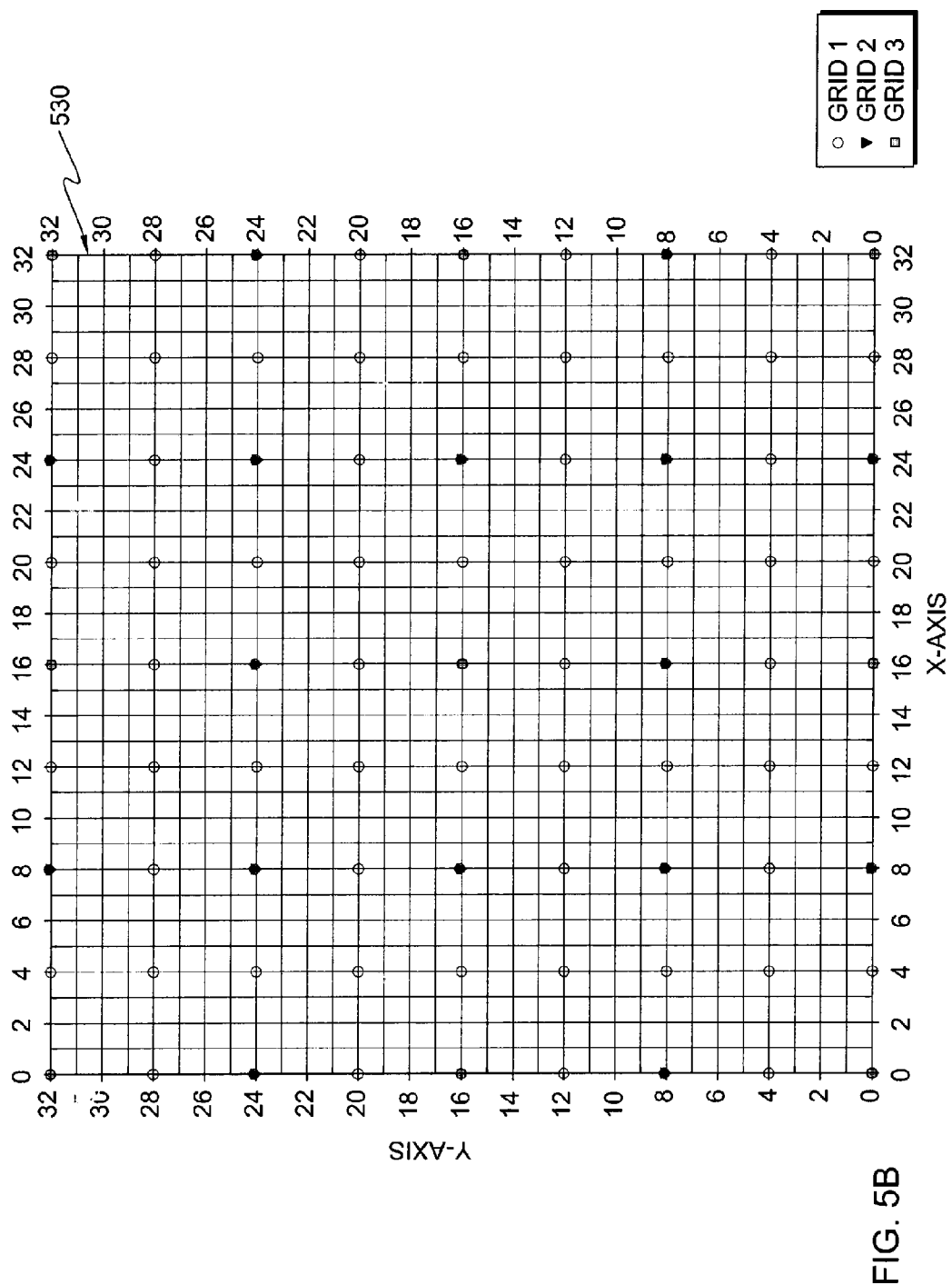
FIG. 5B depicts one embodiment of a 2-D coarse multi-grid mesh employed by the initial solve process of FIG. 5A, in accordance with one or more aspects of the present invention.

FIG. 5A depicts one embodiment of the initial solve 400. In this embodiment, a computational fluid dynamics model of the data center is built 500, and boundary conditions are defined 505 for the computational fluid dynamics model (as explained above). The computational fluid dynamics model could be built with a commercially-available CFD code, such as ANSYS FLUENT flow modeling software, available from ANSYS, Inc., of Canonsburg, Pa., USA. Next, a coarse multi-grid mesh (e.g., grid 1-3) is created for the solution domain 510. FIG. 5B illustrates one example of a bounded domain 530, such as a data center room, and a coarse multi-grid mesh (comprising grids 1-3) for use during the initial solve 400.

As illustrated in FIG. 5B, each grid (e.g., grid 1, grid 2 and grid 3) sets out a geometric pattern across the bounded domain 530, which results in a plurality of cells being defined in the bounded domain. For example, a cell is the space within the domain defined by adjoining points in the respective grid pattern. The coarse multi-grid mesh depicted in FIG. 5B is also referred to herein as a "coarse mesh" for the initial solve. The boundary conditions refer to conditions at the boundary of the solution domain. For example, reference the solid line around the perimeter of the bounded domain 530 depicted in FIG. 5B.

Continuing with the embodiment of FIG. 5A, initial solve processing next comprises setting convergence criteria for the solve 515. Convergence can be achieved by meeting predefined residuals criteria for the continuity, flow and/or energy equations or a preset number of iterations through the initial solve. The solution domain model is initialized with substantially all zeros for the velocities and gauge pressure, along with an ambient temperature 520. As an option, one of the variables, such as y-velocity, may be a small, non-zero value (e.g., 0.0001) to ensure that the solver processes the initial solve.

Processing then solves the initial computational fluid dynamics model of the bounded domain using the set of inviscid equations (such as described above) and a multi-grid method, such as a V-multi-grid method, W-multi-grid method, or FMG-multi-grid method, each of which are known in the multi-grid processing art. As known, multi-grid processing, when solving computational fluid dynamics equations, will facilitate solving of the equations. In a V-multi-grid processing method, the solver begins with the finest grid and progresses to the coarsest grid through restrictions, and then progresses back to the finest grid through interpolation. Similarly, one implementation of the W-multi-grid method starts with the finest grid and restricts down to the coarsest grid, and then interpolates up a grid level, and then restricts down a grid level, and then interpolates back to the finest grid. Other variations of the basic V and W methods of restriction and interpolation can facilitate increased solver speed. In addition, one of ordinary skill in the art could readily employ a full-multi-grid (FMG) method, if desired.

Continuing with the overview process of FIG. 4, after the initial solve 400, a second solve is performed 405. In one embodiment, this second solve may employ the coarse mesh grids employed in the initial solve (e.g., see FIG. 5B), along with a basic turbulence model, and the initial solution from the initial solve 400. As noted, a "turbulence model" is used herein to refer to a computational fluid dynamics model with turbulence equations. As explained above, a computational fluid dynamics model with turbulence equations presents a more complex solution than a solve employing a set of inviscid equations only, such as the case with the initial solve 400. Thus in the second solve, the CIVSM reruns the model using the solution to the initial solve 400 as the initial solution with, for instance, the coarse mesh grids employed in the initial solve, or alternatively, a more refined "medium" mesh, as well as using a basic turbulence model, such as the zero-equation mixing-length model.

Figure 5C:
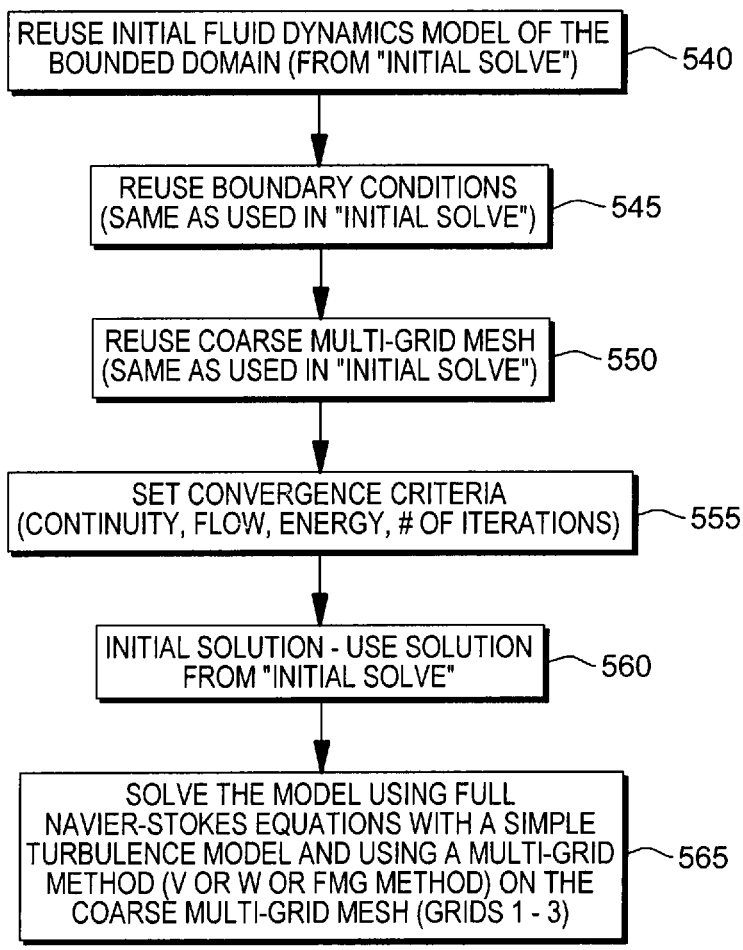
FIG. 5C depicts one embodiment of a second solve process for the computational fluid dynamics modeling approach of FIG. 4, in accordance with one or more aspects of the present invention.

FIG. 5C depicts one embodiment of the second solve process 405. As noted, in one embodiment, the second solve reuses the initial fluid dynamics model of the bounded domain from the initial solve 540, and reuses the boundary conditions employed in the initial solve 545, and the coarse multi-grid mesh (e.g., see FIG. 5B) used in the initial solve 550. The convergence criteria is set based on, for example, continuity, flow, energy or number of iterations 555, which for the second solve, may be the same or different from the criteria used in the initial solve. As an initial solution to the second solve, the solution from the initial solve is employed 560. The second solve solves the initial fluid dynamics model for the bounded domain using the full Navier-Stokes equations (discussed above) with a simple turbulence model (e.g., zero equation turbulence model) and uses (in one embodiment) a multi-grid processing approach (whether V, W, or FMG processing) 565. As part of the solution to the second solve, the cells of the one or more grids will have associated therewith one or more turbulence characteristics.

Figure 6A:
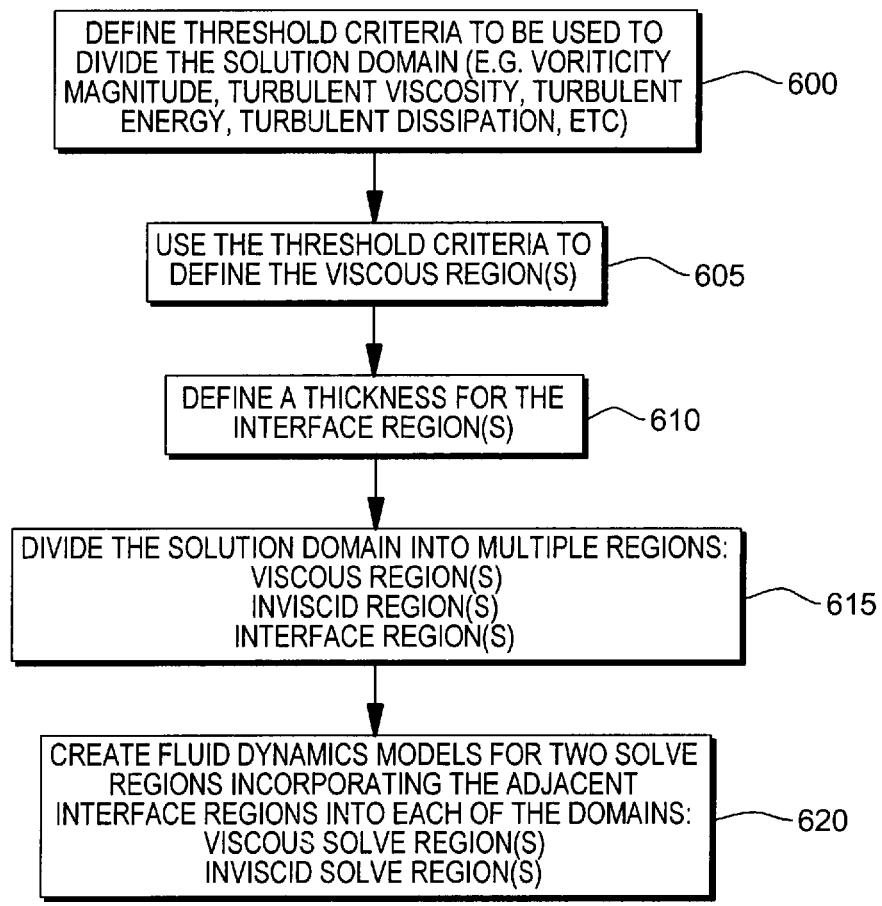
FIG. 6A depicts one embodiment of a process for partitioning the bounded domain into one or more viscous regions, one or more inviscid regions, and one or more interface regions, in accordance with one or more aspects of the present invention.

Returning to the overview process of FIG. 4, processing next partitions the domain into one or more viscous regions and one or more inviscid regions 410. One process for dividing the domain is illustrated in FIG. 6A.

Initially, a threshold criteria may be defined for use in dividing the bounded domain 600. This threshold criteria may comprise a threshold of a turbulence characteristic associated with the cells of the multi-grid mesh employed in the first and second solves. By way of example, the turbulence characteristic may be a flow characterization, such as vorticity magnitude, turbulent viscosity, turbulent kinetic energy, turbulent dissipation, etc. The threshold criteria and the associated turbulence characteristics of the cells may be used in defining one or more viscous regions 605. A thickness of an interface region(s) is defined, wherein the interface region(s) comprises a region(s) of the bounded domain between the one or more viscous regions and one or more inviscid regions 610. The domain is then divided into multiple regions, including one or more viscous regions, one or more inviscid regions, and one or more interface regions 615. Different fluid dynamic models may be created for the different viscous and inviscid regions, incorporating the adjacent interface regions into each of the respective sub-domains, resulting in one or more viscous solve regions and one or more inviscid solve regions 620.

Figure 6B:
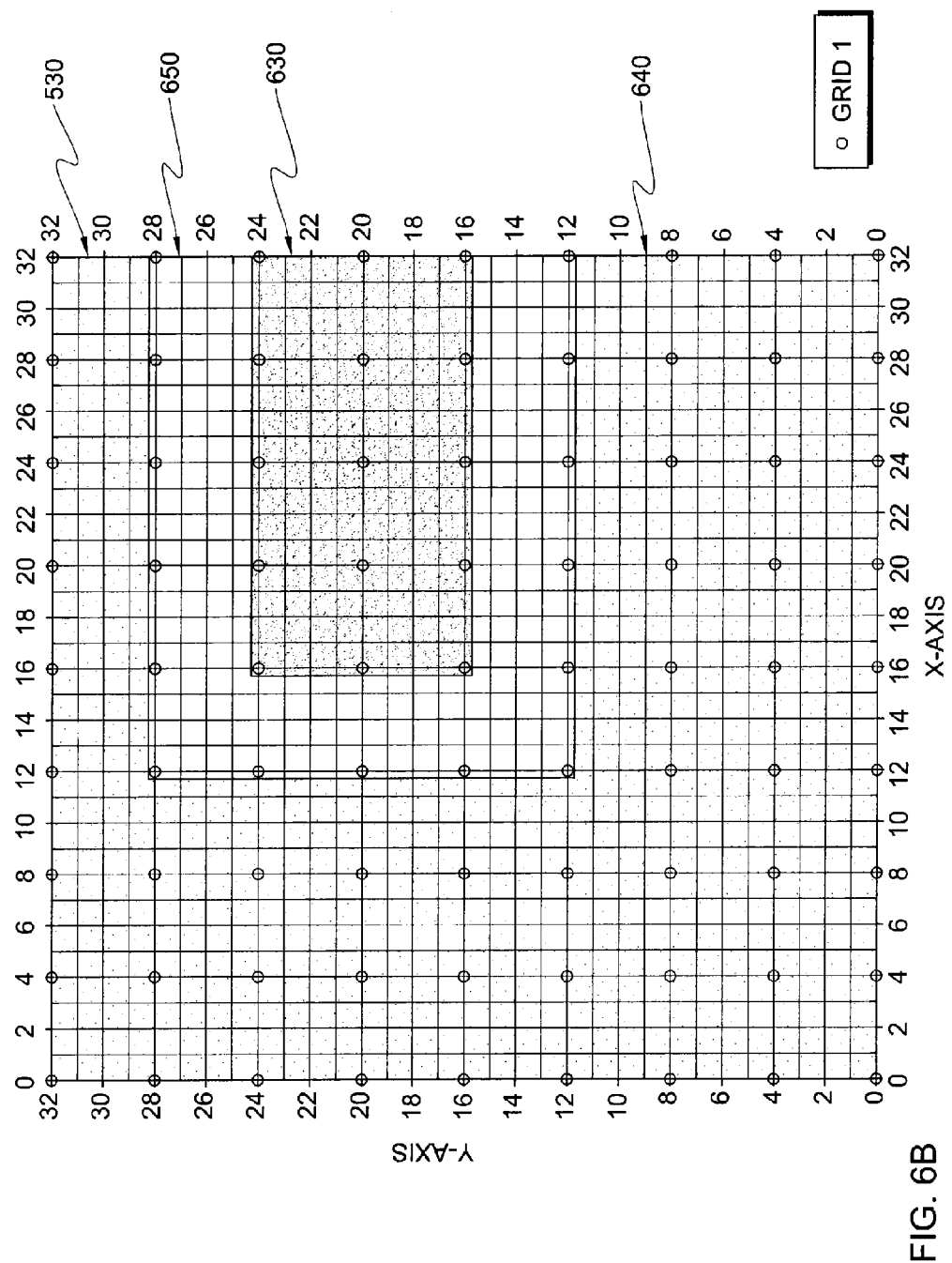
FIG. 6B depicts one embodiment of a 2-D bounded domain divided into a viscous region, an interface region, and an inviscid region, in accordance with the processing of FIG. 6A, and in accordance with one or more aspects of the present invention.

FIG. 6B illustrates (by way of example only) bounded domain 530 divided into a viscous region 630, an inviscid region 640, and an interface region 650 disposed between the viscous region and the inviscid region. In this example, interface region 650 is assumed to be one cell thick, and as explained further below, facilitates passing boundary conditions between the viscous region's solve and the inviscid region's solve. Note that in practice, there may be multiple separate viscous regions and/or multiple separate inviscid regions within the bounded domain. Note also that the interface region disposed between a particular viscous region and inviscid region, may be joined as part of both regions in the solve processing described herein.

Figure 7:
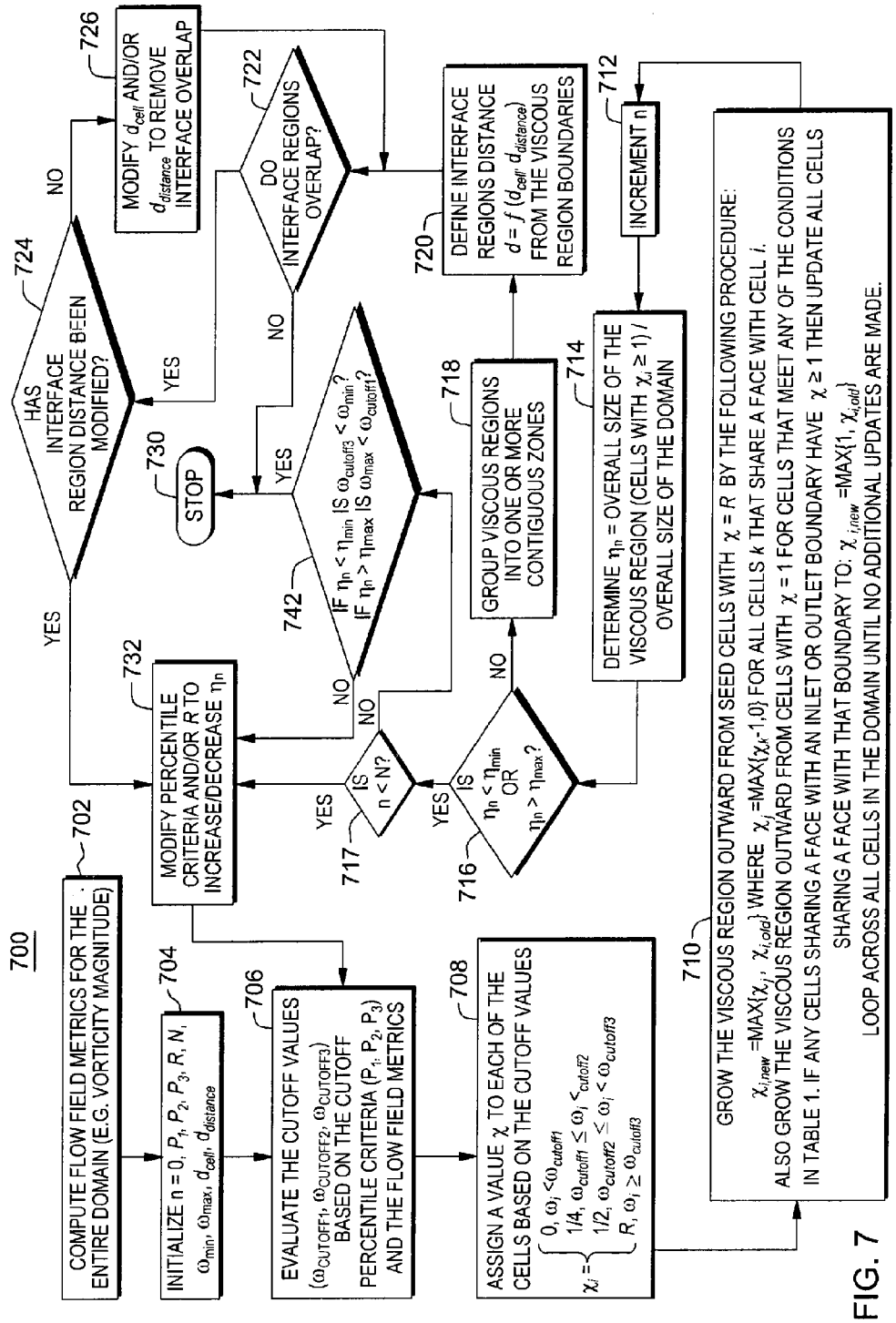
FIG. 7 depicts another embodiment of a process for partitioning a bounded domain into one or more viscous regions, one or more inviscid regions, and one or more interface regions, in accordance with one or more aspects of the present invention.
Figure 8A:
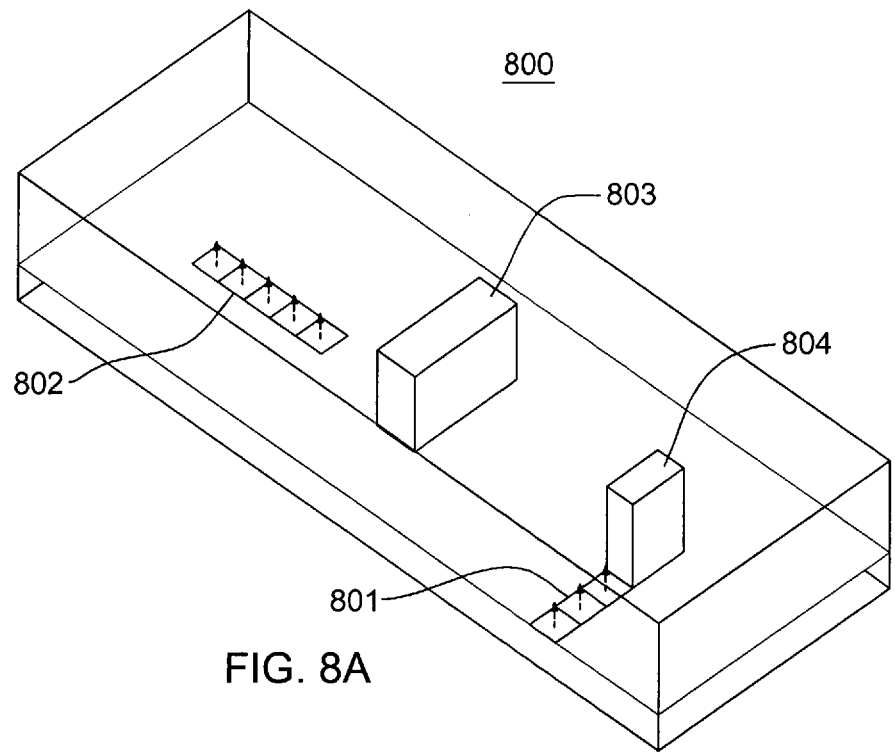
FIG. 8A depicts an exemplary data center to be automatically partitioned using, for instance, the partitioning processing of FIG. 7, in accordance with one or more aspects of the present invention.
Figure 8B:
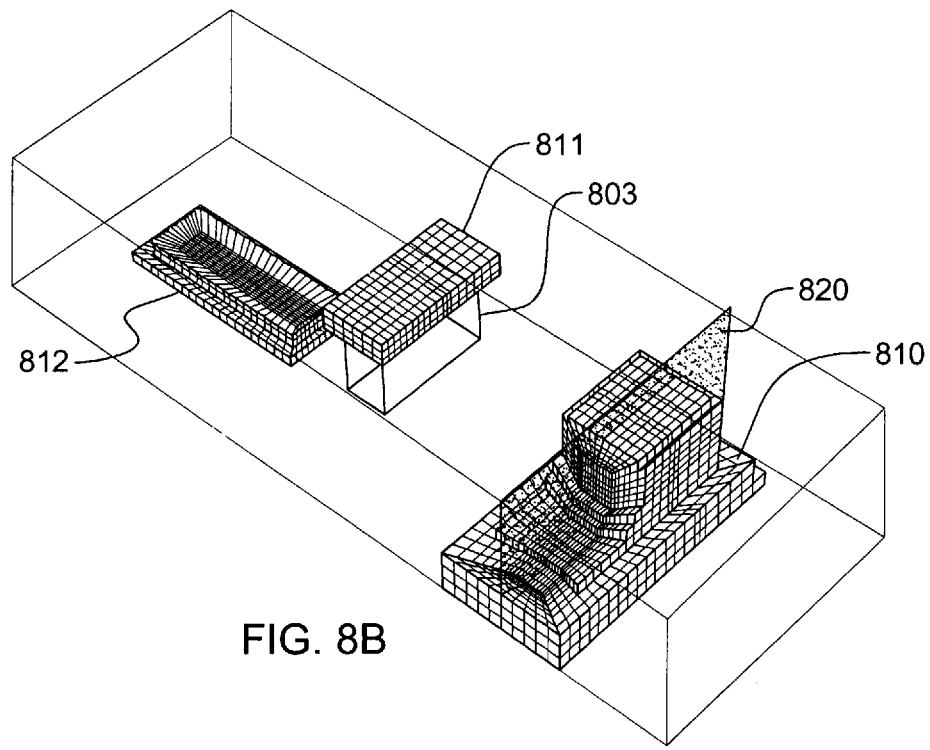
FIG. 8B depicts one embodiment of the data center of FIG. 8A, with three distinct viscous regions having been modeled using the partitioning process of FIG. 7, in accordance with one or more aspects of the present invention.
Figure 8C:
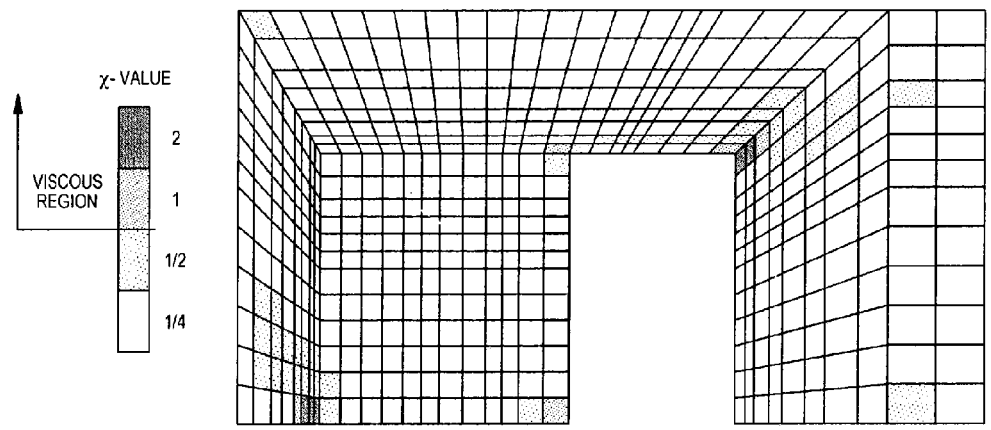
FIG. 8C is a representation of a cut plane through the data center of FIG. 8A, including through the electronics rack, and illustrating initially assigned χ values for cells of the data center intersected by the cut plane using the partitioning process of FIG. 7, in accordance with one or more aspects of the present invention.
Figure 8D:
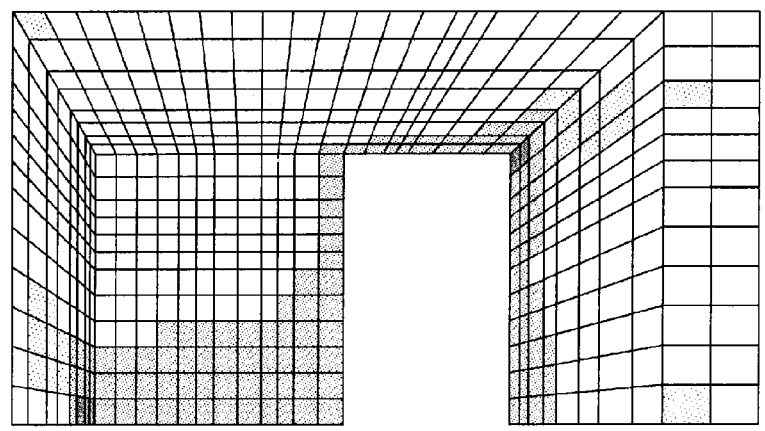
FIG. 8D depicts the cut plane of FIG. 8C after a first, partial growing of the viscous region using the processing of FIG. 7, in accordance with one or more aspects of the present invention.
Figure 8E:
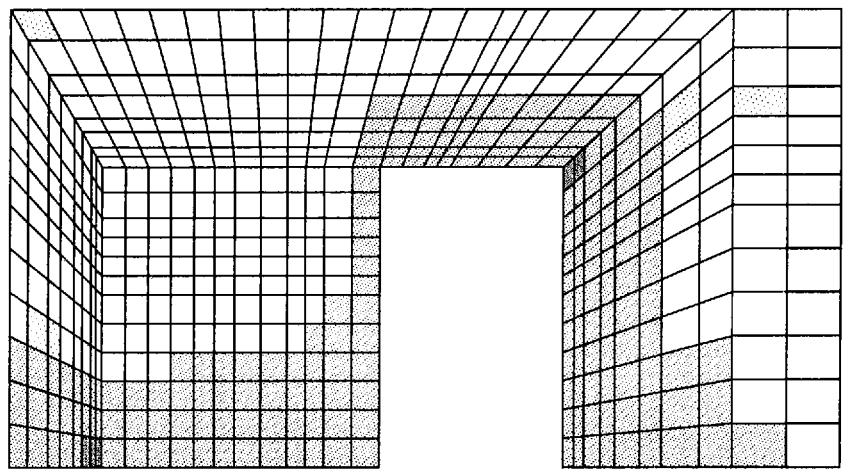
FIG. 8E depicts the cut plane of FIG. 8D, after completing growing of the viscous region using the processing of FIG. 7, in accordance with one or more aspects of the present invention.
Figure 8F:
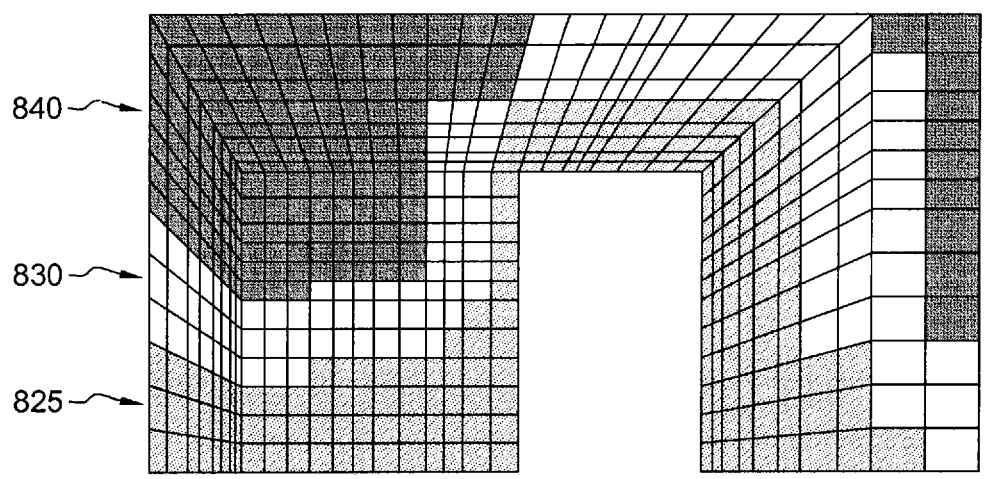
FIG. 8F depicts the cut plane of FIG. 8E, with one example of the resultant partitioned regions of the data center obtained using the processing of FIGS. 4 & 7, in accordance with one or more aspects of the present invention.
Figure 8G:
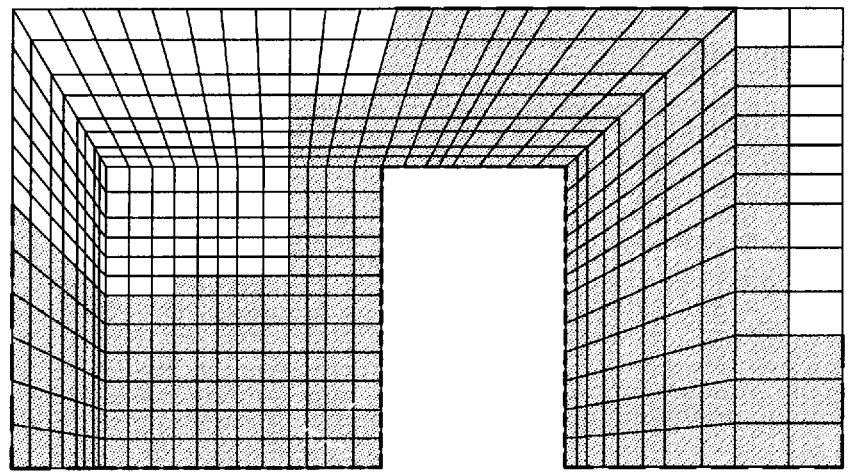
FIG. 8G depicts the cut plane of FIG. 8F, with one embodiment of input for the viscous domain solve shown as including the viscous region and the interface region, in accordance with one or more aspects of the present invention.
Figure 8H:
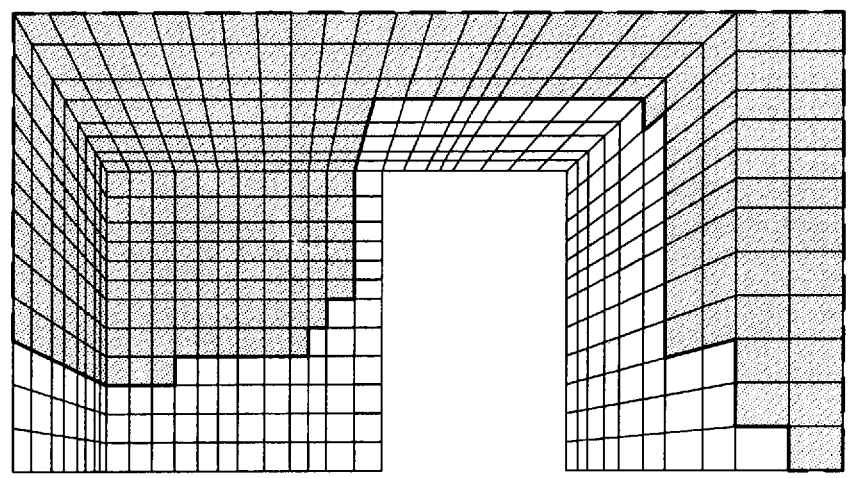
FIG. 8H depicts the cut plane of FIG. 8F, with one embodiment of the input for inviscid domain solve shown as including the inviscid region and the interface region, in accordance with one or more aspects of the present invention.

FIGS. 7-8H depict another approach to bounded domain partitioning, in accordance with one or more aspects of the present invention. Referring to FIG. 7, partitioning process 700 includes computing flow field metrics for the entire bounded domain using a desired flow characteristic 702. A variety of flow criteria may be employed including, for instance, turbulent viscosity ratio, vorticity magnitude, production of k, turbulent dissipation-$\varepsilon$, etc. Of the criteria available, vorticity magnitude may be particularly beneficial in determining location of the different regions within a bounded domain. Two reasons for choosing vorticity magnitude are that it is easily determined based on the flow field within the bounded domain regardless of the flow model used, and both viscosity effects and turbulence will be most prevalent where there is significant vorticity.

After performing the second solve step using a basic turbulence model as described above, the vorticity magnitude may be determined and sorted for the cells in the bounded domain. Variables are initialized 704 including, n, $P_1$, $P_2$, $P_3$, R, N, $\omega_{min}$, $\omega_{max}$, $d_{cell}$, $d_{distance}$, where:

n=number of iterations of the partitioning process;

$P_1$=percentile cutoff value used to determine $\omega_{cutoff1}$, the least stringent of, for instance, three (e.g., 10%);

$P_2$=percentile cutoff value used to determine $\omega_{cutoff2}$, the middle of the three (e.g., 2.5%);

$P_3$=percentile cutoff value used to determine $\omega_{cutoff3}$, the most stringent of the three (e.g., 1%);

R=viscous region cell radius parameter, which may be defined as a natural number of cells;

N=maximum number of iterations of the partitioning process;

$\omega_{min}$=minimum vorticity magnitude (or other flow parameter) allowed to continue using modeling process of FIGS. 4 & 7;

$\omega_{max}$=maximum vorticity magnitude (or other flow parameter) allowed to continue using modeling process of FIGS. 4 & 7;

$d_{cell}$=length of the interface region in terms of grid cells normal to the viscous region; and $d_{distance}$=length of the interface region in terms of linear distance out from the viscous region.

In the exemplary partitioning process depicted, three cutoff values ($\omega_{cutoff1}$, $\omega_{cutoff2}$, $\omega_{cutoff3}$) may be determined 706 based on the cutoff percentile criteria $P_1$, $P_2$, $P_3$ of, for instance, vorticity magnitude within the bounded domain. Note that since $P_1 > P_2 > P_3$, then $\omega_{cutoff1} < \omega_{cutoff2} < \omega_{cutoff3}$.

Cells within the bounded domain are assigned a $\chi_i$ value based on the determined flow characteristic or parameter, such as vorticity magnitude ($\omega_i$) 708. In one or more embodiments, the $\chi$ value for the ith cell may be assigned as follows:

$$\chi_i = \begin{cases} 0, & \omega_i < \omega_{cutoff1} \\ 1/4, & \omega_{cutoff1} \leq \omega_i < \omega_{cutoff2} \\ 1/2, & \omega_{cutoff2} \leq \omega_i < \omega_{cutoff3} \\ R, & \omega_i \geq \omega_{cutoff3} \end{cases}$$

where (as noted) R is the set viscous region cell radius parameter, which is defined as a natural number of cells (for instance, 2), and $\chi_i$ is a variable used in the iterative partitioning process to determine if a cell is to be included in a viscous region (e.g., where $\chi_i \geq 1$). After viscous region growth has completed as described below, cells with a set $\chi$ value, for instance, $\chi \geq 1$, are identified for inclusion in the viscous region(s).

The size of the one or more identified viscous regions may next be selectively grown or increased 710, in accordance with one or more aspects of the present invention, in order to provide a faster and potentially more accurate solution for the bounded domain using the CIVSM approach. An issue with the approach of 6A & 6B is that too many noncontiguous and irregular shaped viscous regions may be identified, which could reduce the speed advantage of using the CIVSM, and in certain instances, could result in the method having difficulty converging to a solution. This can be addressed by selectively growing or increasing the identified viscous regions from cells with higher flow characteristic values, that is, the higher assigned $\chi$-values in order to provide more contiguous, larger and less irregular shaped viscous regions.

For instance, in one or more embodiments, cells with the highest vorticity magnitude within the domain ($\omega_i \geq \omega_{cutoff3}$), referred to herein as "seed cells", may be used to, at least in part, grow the viscous region(s). For example, assume that any cell bordering a seed cell (with radius R) is to be included in the viscous region. This can be accomplished by recursively changing the $\chi$ value of any cell sharing a face or border with a seed cell to the maximum of $\{R-1, \chi_i\}$ and then having those cells act as seed-type cells by changing the $\chi$ value of any cell sharing a border with these new seed-type cells to the maximum of $\{R-2, \chi_i\}$, and continuing the procedure until a next seed-type cell $\chi$ value would equal 1. Note that the highest $\chi$ value for a cell is retained, and the $\chi$ value is never lowered. For example, if two neighboring cells are seed cells, then they both have $\chi$=R rather than having one of the two change the other to a lower $\chi$ value of R−1. In this way the viscous regions grow outward in a "sphere", with radius R from centers located at the seed cells.

The viscous regions may alternatively, or also, be expanded by another growth function based on each cell's $\chi$-value, its neighboring cells' $\chi$-values, and whether or not the cell is adjacent to a boundary of the domain. For instance, cells that meet any of the conditions shown in Table 1 below may be updated to a $\chi$ value of 1.

TABLE 1

| Condition | $\chi_i$ | Minimum number of adjacent cells with $\chi$ = 1 | Cell is adjacent to a boundary |
|---|---|---|---|
| 1 | 1/2 | 1 | — |
| 2 | 1/4 | 2 | — |
| 3 | 1/4 | 1 | Yes |
| 4 | 0 | 3 | — |
| 5 | 0 | 2 | Yes |

In one or more implementations, if any cell is adjacent to an inlet or outlet boundary and has a $\chi$ value that is greater than or equal to 1, then all cells adjacent to that boundary may be changed to $\chi$=1. This ensures that the flow boundary conditions are either entirely in the viscous region or entirely in the inviscid region and not split among the two regions. The viscous growth procedures 710 continuously update the $\chi$ value for all of the cells in the domain until no new cells are updated. Examples of the different regions with initial and final $\chi$ values, as well as intermediate values in the process are demonstrated for a cross section or cut plane of an exemplary data-center in FIGS. 8A-8H, which are described below.

Continuing with FIG. 7, after the viscous regions have finished growing, the variable n is incremented 712 and the ratio ($\eta_n$) of the overall size of the viscous region to the overall size of the domain is determined 714 and compared to the minimum ($\eta_{min}$) and maximum ($\eta_{max}$) allowable ratios 716. If the viscous region(s) comprises too little or too much of the bounded domain, and variable n is less than the maximum number N of iterations of the partitioning process 717, then the parameters used in the process ($\omega_{cutoff1}$, $\omega_{cutoff2}$, $\omega_{cutoff3}$, R) may be automatically modified 732 in order to expand or shrink the viscous region(s) as desired, and the viscous region partitioning process may be repeated by evaluating the new cutoff values based on the modified cutoff percentile criteria and the flow field metrics 706.

In order to take advantage of benefits that the CIVSM approach offers, the method should ensure there is a large enough inviscid domain to help reduce computational effort as compared to a fully viscous model and a large enough viscous domain to add any detail that would be lost in a fully inviscid model. Thus, the CIVSM approach may beneficially be used where clear distinctions between inviscid and viscous domains exist. If after N iterations (n≥N) 717 of modifying the parameters ($\omega_{cutoff1}$, $\omega_{cutoff2}$, $\omega_{cutoff3}$, R) 732, the ratio ($\eta_n$) of the overall size of the viscous region to the overall size of the domain is less than the minimum ($\eta_n < \eta_{min}$) or greater than the maximum ($\eta_{max} < \eta_n$) 716, then the values of the cutoff parameters are compared to their limits ($\omega_{cutoff3} < \omega_{min}$ for $\eta_n < \eta_{min}$, or $\omega_{max} < \omega_{cutoff1}$ for $\eta_{max} < \eta_n$) 742. If the parameters exceed their limits, then processing stops 730, and the model should be run as either a fully inviscid ($\omega_{cutoff3} < \omega_{min}$) or fully viscous ($\omega_{max} < \omega cutoff_1$). If the parameters do not exceed their limits, then the parameters may be further modified until either the overall size of the viscous region to the overall size of the domain is within the limits 716 and the CIVSM can continue to the next step 718, or the parameters exceed their limits and the model should be run as either fully inviscid or fully viscous, and thus the partitioning process stops, 730.

Once the overall size of the viscous region to the overall size of the domain falls within the minimum and maximum limits ($\eta_{min} < \eta_n < \eta_{max}$) 716, then the viscous regions are grouped into one or more contiguous zones 718. The interface regions are may be defined based on a specified distance ($d_{distance}$) and/or cell count ($d_{cell}$) from each of the contiguous viscous regions 720. These regions may grow outward from the viscous regions into the inviscid regions, and may be incorporated into both the viscous and inviscid domains. A check may be performed to ensure there is no overlap in the interface regions emanating from the different viscous regions 722. If there is an overlap, then the partitioning process determines whether the interface region distance has been modified 724 and if "no", then the interface regions can be reduced in size to try to eliminate the overlap 726. If the overlap remains after the interface size is reduced, then the cutoff parameters 732 may be modified to either try to reduce the viscous regions so that there is a large enough gap between the viscous regions so the interface regions to not overlap, or they may be modified to include the gap between the offending viscous regions to create a new, larger contiguous viscous region. After the interface region is defined and there is no overlap between the different regions 722, then the partitioning process is complete 730 and the viscous and inviscid domains can be created.

The partitioning process may be implemented so that it automatically modifies the percentiles and/or the radius R for the partitioning as needed. Different starting parameters can lead to slightly different partition results, but the partitions will typically not be significantly different from each other as to affect the overall solution.

One example of the above-described partitioning process is depicted in FIGS. 8A-8H. In FIG. 8A, a simplified raised floor data center 800 is depicted as comprising rows 801, 802 of perforated floor tiles, a computer room air conditioning unit 803 and one or more electronics racks or IT equipment 804. A result of the above-described partitioning process of FIG. 7 is depicted in FIG. 8B, where three distinct viscous regions 810, 811 & 812 have been identified, with viscous region 810 encompassing perforated floor tiles 801 (FIG. 8A) and electronics rack 804 (FIG. 8A), viscous region 811 being associated with computer room air conditioning unit 803, and viscous region 812 being associated with perforated floor tiles 802 (FIG. 8A).

FIG. 8C depicts one example of cut plane 820 through viscous region 810 (FIG. 8B) using the partitioning process described above, and with the cut plane 820 depicted at an early stage in the processing, that is, after assigning the $\chi$ values to each of the cells based on the characteristic cutoff values ($\omega_{cutoff1}$, $\omega_{cutoff2}$, $\omega_{cutoff3}$). Note that three characteristic cutoff values are discussed herein by way of example only. In other implementations, two characteristic cutoff values or four or more characteristic cutoff values could be used. All of the cells within the bounded domain are marked with a $\chi_i$ value based on the ascertained flow characteristic value (e.g. vorticity magnitude (o,)) for the cell as defined above. For instance, in one or more embodiments, each cell is assigned either 0, ¼, ½, or R in one example, where R is the viscous region cell radius and may be set initially at, for instance, 2 or 3 as desired. In the example described herein, R=2. In FIG. 8C, the initial $\chi$ values are depicted, with only a few of the cells in cut plane 820 being identified as $\chi$ value R (i.e., 2).

FIG. 8D depicts cut plane 820 of FIG. 8C after partial growth of the viscous region through the cut plane using the above processing. For instance, the cells with the highest vorticity magnitude within the domain ($\omega_i \geq \omega_{cutoff3}$), referred to herein as seed cells, may be used to grow the viscous region(s). For example, any cell bordering a seed cell with radius R is to be included in the viscous region. This may be accomplished by recursively changing the $\chi_i$ value of any cell i sharing a border with a seed cell to max {R−1, $\chi_i$}, and then having those cells themselves act as seed-type cells by changing the $\chi$-value of any other cell i sharing a border with these new seed-type cells to maximum {R−2, $\chi_i$}, and continuing the procedure until the $\chi$ value of the starting seed-type cell equals 1. Note that the highest $\chi$ value for a cell is always retained, and a $\chi$ value is never lowered in this process. As noted, if two neighboring cells are seed cells, then they both have a $\chi$ value equal to R, rather than having one of the two cells change or lower its $\chi$ value. In this manner, the viscous regions within the bounded domain grow outward in a sphere with radius R from centers located at the seed cells. FIG. 8D depicts one example of an intermediary viscous region obtained during this growing or selectively increasing process.

In one or more implementations, the partitioning process also expands the viscous regions by another growth function that is based on each cell's $\chi$ value, its' neighboring cells' $\chi$ values, and whether or not the cell is adjacent to a boundary. Cells that meet any of the conditions shown, for instance, in Table 1 above are updated to a $\chi$ value of 1. If any cell adjacent to an inlet or outlet boundary has a $\chi$ value that is greater than or equal to 1, then all the cells adjacent to that boundary are changed to $\chi$=1. This ensures that the flow boundary conditions are either entirely in the viscous region or the inviscid region, and are not split between the two types of regions. The viscous growth procedures continuously update the $\chi$ values for the cells in the domain until no new cells are updated. FIG. 8E depicts cut plane 820 of FIG. 8D with a final viscous region illustrated using the processing of FIG. 7. Once the viscous regions are defined, they are grouped in contiguous zones, such as those depicted in FIG. 8B.

As shown in FIG. 8F, interface regions 830 may be defined based on a specified distance ($d_{distance}$) and/or cell count ($d_{cell}$) from each of the contiguous viscous regions 825. The interface regions grow outward from the viscous regions into the inviscid regions 840 and are incorporated into both the viscous domains and the inviscid domains during the respective solves. This is illustrated in FIGS. 8G & 8H where the viscous and inviscid domains, respectively, are depicted for cut plane 820 of the data center in this example. As noted above, in one or more implementations, prior to creating the viscous and inviscid domains depicted, a check may be performed to ensure that there is no overlap in the interface regions emanating from different viscous regions. If there is an overlap, then the interface regions may be reduced in size to try to eliminate the overlap, and/or cutoff parameters may be modified to, for instance, reduce the size of the viscous regions so that there is a large enough gap between adjacent viscous regions for the interface regions not to overlap, or may be modified to enlarge the viscous regions to include the gap between the adjacent viscous regions and thereby create a new, larger contiguous viscous region.

With the above processing, the problem of defining too many noncontiguous and/or irregularly shaped viscous regions is addressed, allowing increased performance using the CIVSM approach.

Figure 9:
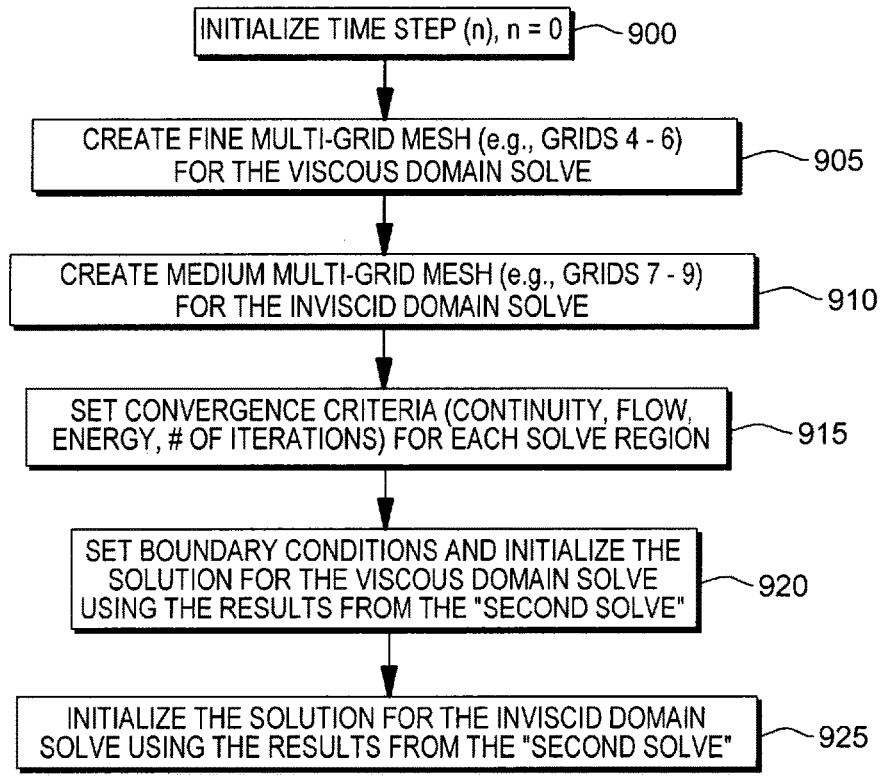
FIG. 9 depicts one embodiment of an initializing process, including initializing a time step (n), for the computational fluid dynamics modeling approach of FIG. 4, in accordance with one or more aspects of the present invention.

Continuing with the overview process of FIG. 4, the regions are combined to create a viscous solve domain and an inviscid solve domain 415. For instance, the viscous region is combined with the interface region to create the viscous solution domain, and the inviscid region is combined with the interface region to create the inviscid solution domain. These separate solutions are initialized, including a time step (n), which is set to 1. FIG. 9 illustrates one example of an initialization process.

In FIG. 9, in addition to initializing the time step (n), that is, setting time step (n) equal to zero 900, a fine multi-grid mesh (e.g., grids 4-6) for use in the viscous domain solve may be created 905, as well as a medium multi-grid mesh (e.g., grids 7-9) for the inviscid domain solve 910. As noted, the viscous domain solve involves solving for the one or more viscous regions, and the inviscid domain solve involves solving for one or more inviscid regions of the domain. Convergence criteria is set for each region 915. This convergence criteria may comprise, for example, a continuity criteria, a flow criteria, an energy criteria, or a number of iterations through the solution routine and may differ for each region. Next, boundary conditions are set and the solution for the viscous domain solve is initialized using the results from the second solve processing described above (see FIG. 5C) 920. The solution for the inviscid domain solve is initialized using the results from the second solve 925.

Figure 10A:
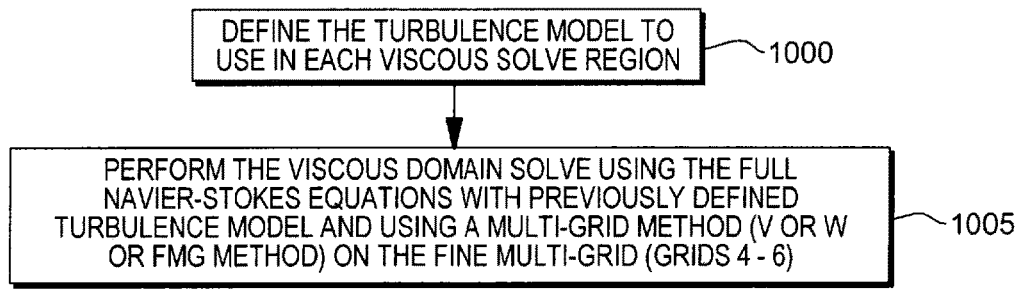
FIG. 10A depicts one embodiment of a viscous domain solve for the computational fluid dynamics modeling approach of FIG. 4, in accordance with one or more aspects of the present invention.

As shown in FIG. 4, viscous domain solve is next performed for the one or more viscous solve regions using at least one turbulence model 425. As illustrated in FIG. 10A, this solve may include defining a turbulence model to use for each viscous solve region of the viscous domain solve 1000. As noted, the turbulence model refers to a computational fluid dynamics model with turbulence equations, and a viscous solve region refers to a particular viscous region and, in one or more embodiments, its associated interface region (whereas an inviscid solve region refers to a particular inviscid region and, for instance, the associated interface region). The same turbulence model or different turbulence models may be applied to different viscous solve regions of the domain. For example, depending on the extent of turbulence within the different viscous solve regions, different turbulence models may be desirable. Viscous domain solve is performed for the one or more viscous solve regions using the full Navier-Stokes equations, with the previously defined turbulence model, and using a multi-grid method (whether V, W or FMG method) with a fine multi-grid mesh (e.g., grids 4-6) previously initialized 1005.

Figure 10B:
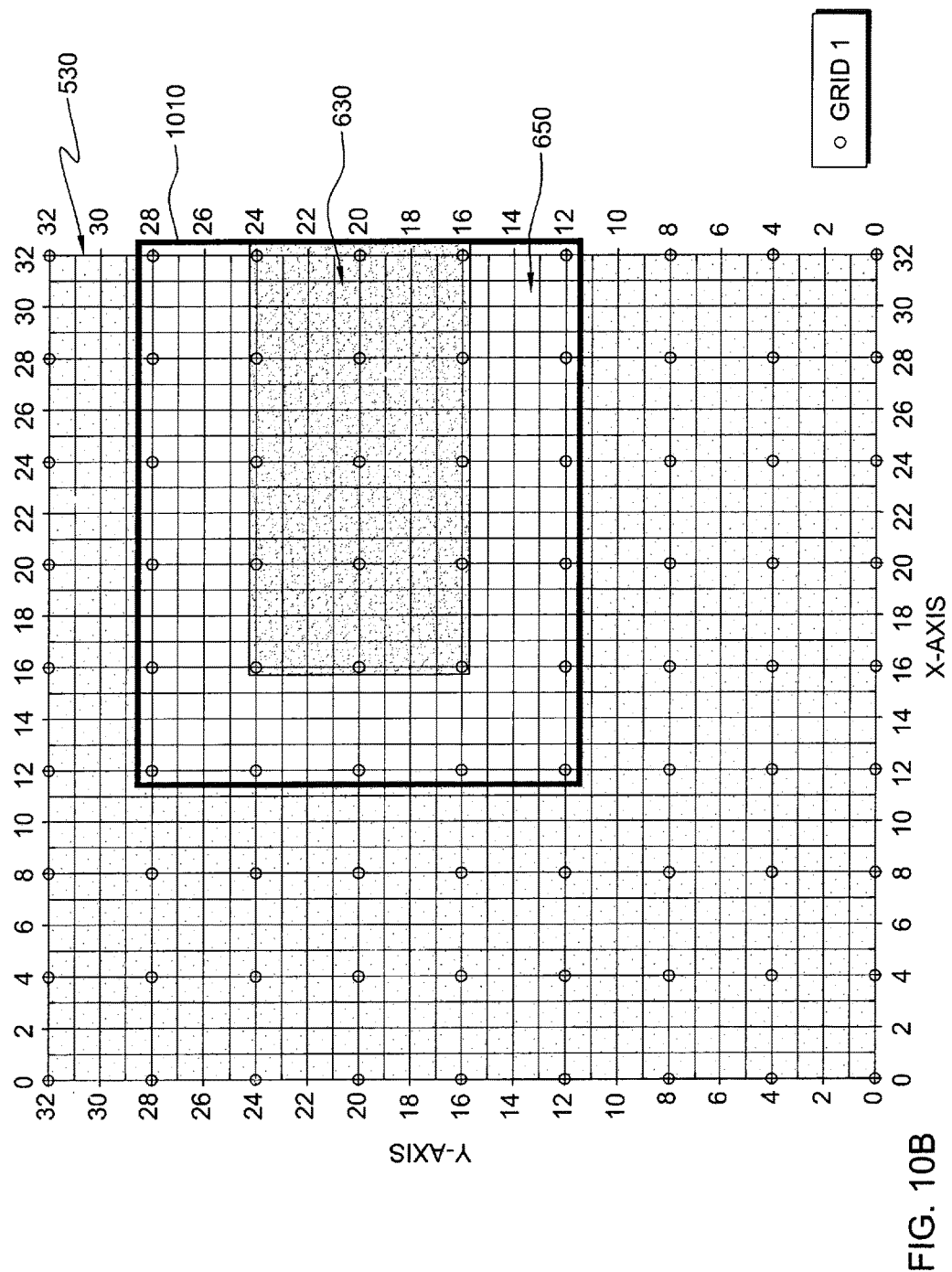
FIG. 10B depicts one embodiment of a 2-D bounded domain and illustrates a viscous region, an interface region and a boundary for boundary conditions for use in the viscous domain solve process of FIG. 10A, in accordance with one or more aspects of the present invention.

By way of example, FIG. 10B depicts bounded domain 530 with a viscous solve region comprising viscous region(s) 630 and interface region(s) 650. The figure illustrates a boundary 1010 for the viscous region's boundary conditions to be employed in the viscous domain solve.

Figure 10C:
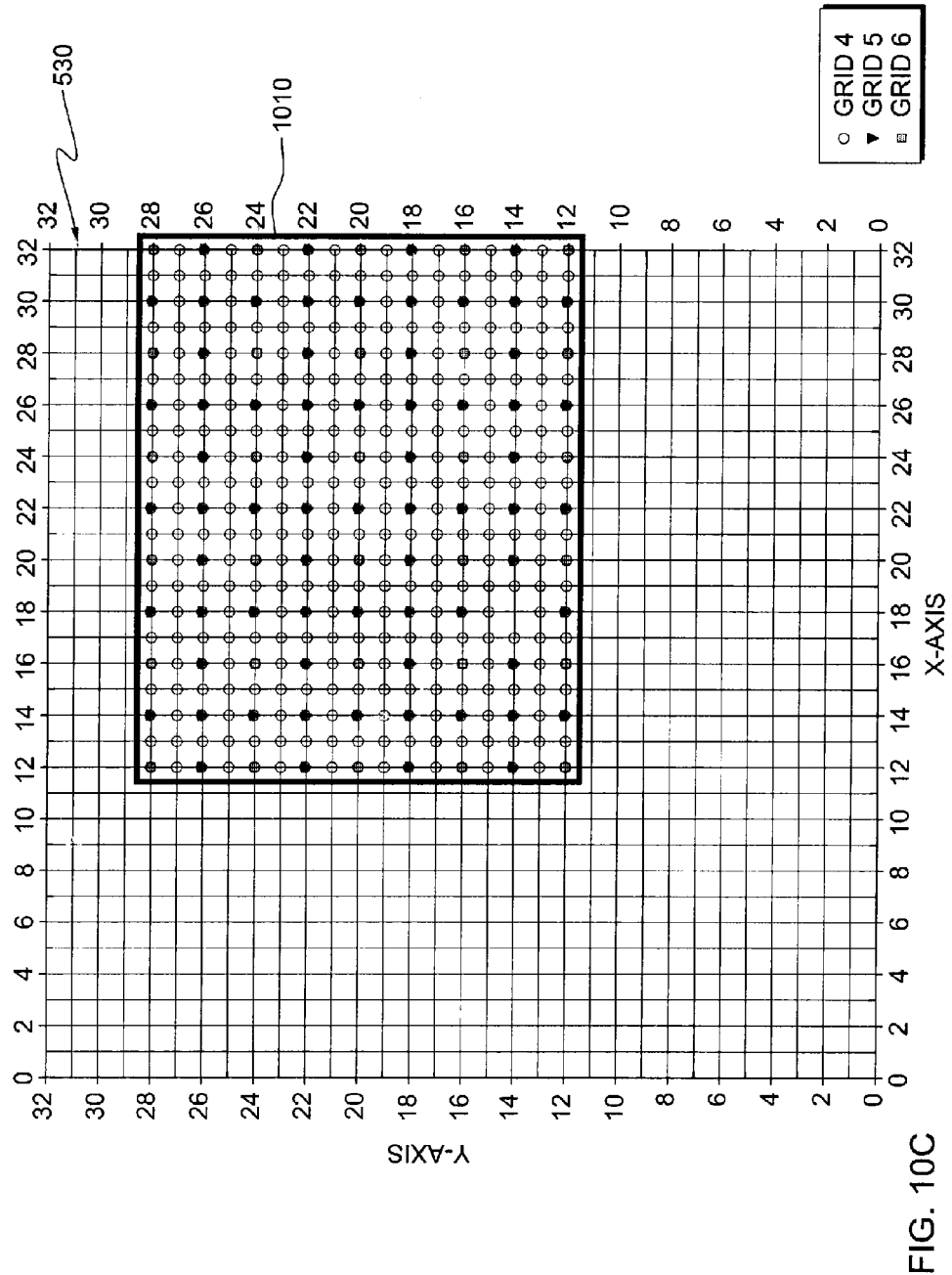
FIG. 10C depicts the 2-D bounded domain of FIG. 10B, and illustrates a fine (or dense) multi-grid mesh for use in the viscous domain solve of the viscous region and interface region using a turbulence model, in accordance with the processing of FIG. 10A, and in accordance with one or more aspects of the present invention.

FIG. 10C depicts the viscous solve region of FIG. 10B, that is, the region within viscous region's boundary 1010, sub-divided using a fine multi-grid mesh comprising grids 4-6 (in this example). As illustrated in FIG. 10C, the fine multi-grid mesh (e.g., grids 4-6) is more dense than the initial coarse multi-grid mesh (e.g., grids 1-3) employed in the initial and second solves described above. Greater density for the cells to be solved is desirable in this location in view of the turbulent nature of the viscous solve region.

Before the individual viscous and inviscid regions can be solved, boundary conditions for the regions need to be defined. In one or more implementations, the boundary conditions for the viscous regions originate from the interior of the inviscid region, and vice versa. For instance, the intersection of the inviscid and interface regions within the inviscid region may form, in part, the outer boundary 1110 (or viscous solve boundary) associated with the one or more viscous regions 1101 in the bounded domain 1100 example of FIG. 11. Similarly, the intersection of the viscous and interface regions within viscous regions 1101 may form, in part, the outer boundary 1120 (or inviscid solve boundary) associated with the inviscid region 1102.

The wall boundary conditions within the viscous and inviscid regions do not change. However, wall boundary conditions do change in the interface region depending upon whether the boundary is being solved in the viscous or inviscid domain. The viscous regions may have no-slip boundary conditions for walls, while the inviscid regions may have no-penetration boundary conditions at the walls.

Due to the elliptic nature of the equations for subsonic, steady flow, the boundary conditions should specify the dependent variables (velocity and temperature), the derivatives of the dependent variables, or a combination of the two, over the entire boundary of the region, as well as specify the pressure at one location within the flow region, in order to create a well-posed problem. Given that the flow patterns within the viscous and inviscid regions are not necessarily aligned with the boundaries, as defined by the partitioning algorithm, it is difficult to distinguish traditional inlet and outlet boundaries. Therefore, the methodology may not allow for applying boundary conditions that are sufficiently upstream or downstream of the area of interest to use zero-gradient boundary conditions. In order to satisfy the flow boundary condition requirements, the velocity components and temperature may be directly specified across all of the flow boundaries. When running an incompressible, unsteady case, time marching from a fully specified initial condition is all that is needed, in addition to the above-noted boundary conditions, in order to well-state the hyperbolic nature of the inviscid region and the parabolic nature of the viscous region.

By directly specifying the velocity components at all boundaries, and thereby the mass flux for an incompressible flow of constant density, satisfying continuity should also be addressed when applying boundary conditions. This leads to the requirement of a mass balance process during the specification of the velocity boundary conditions in order to ensure continuity for the entire region being modeled. Similarly, directly defining the temperature at all the boundaries would over-specify the problem, and constrain the solution.

Figure 11:
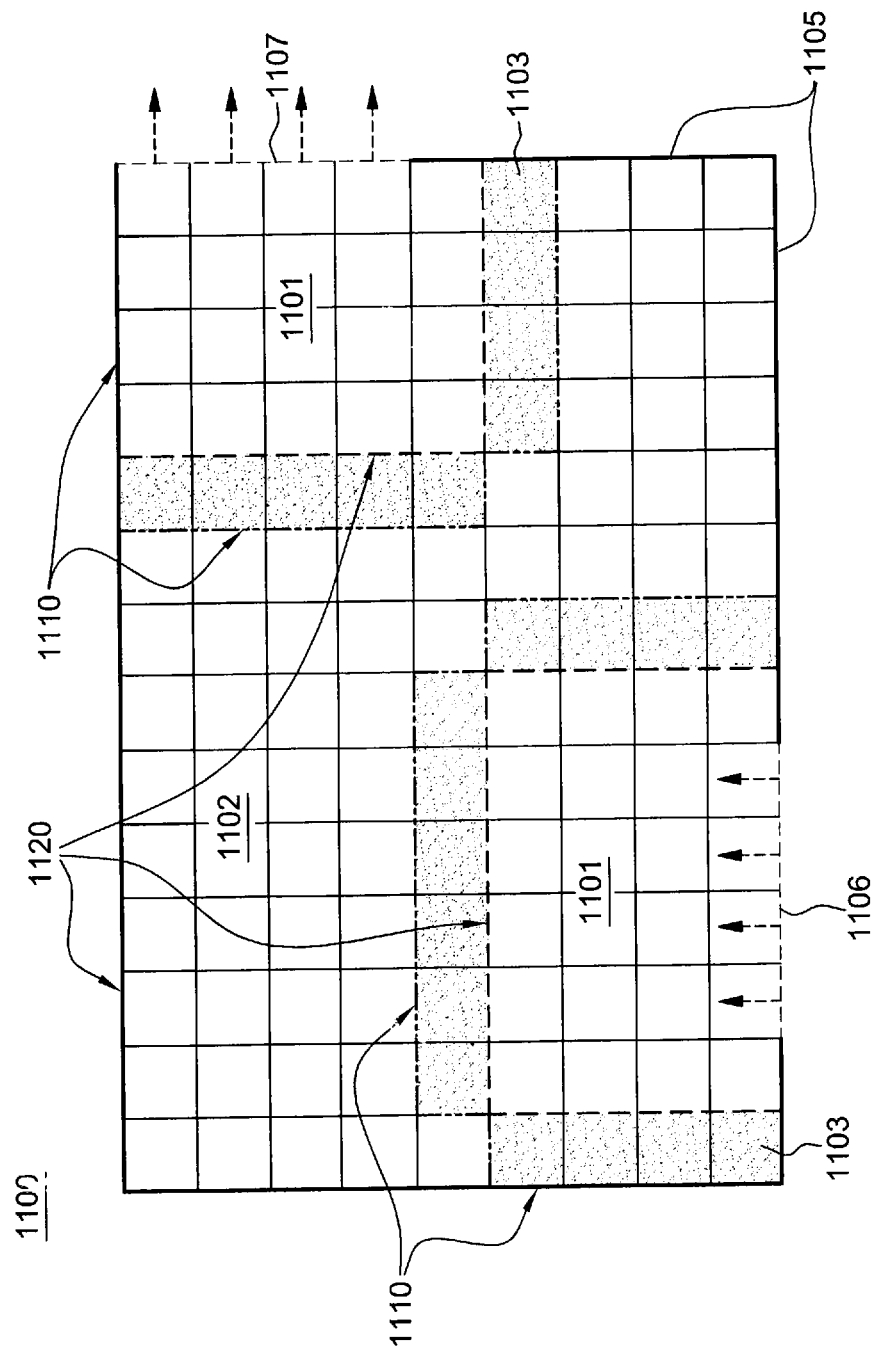
FIG. 11 depicts an example of a bounded domain partitioned into at least one viscous region and at least one inviscid region, and illustrating respective viscous solve and inviscid solve boundaries, in accordance with one or more aspects of the present invention.

In the exemplary bounded domain 1100 of FIG. 11, the CIVSM approach may have as input a wall boundary condition 1105, inlet (source) boundary condition(s) 1106, and outlet (sink) boundary conditions 1107. Using, for instance, the partitioning approach described above, viscous regions 1101 may be defined, as well as interface regions 1103, which create a buffer around viscous regions 1101. Together, the viscous regions and interface regions define the domains of the viscous region to be solved using the computational fluid dynamics model. Note that two viscous regions and corresponding domains are depicted in FIG. 11, by way of example only. Using the above-described processing, the inviscid region 1102 and the interface regions 1103 are combined in order to form the inviscid domain.

Figure 12:
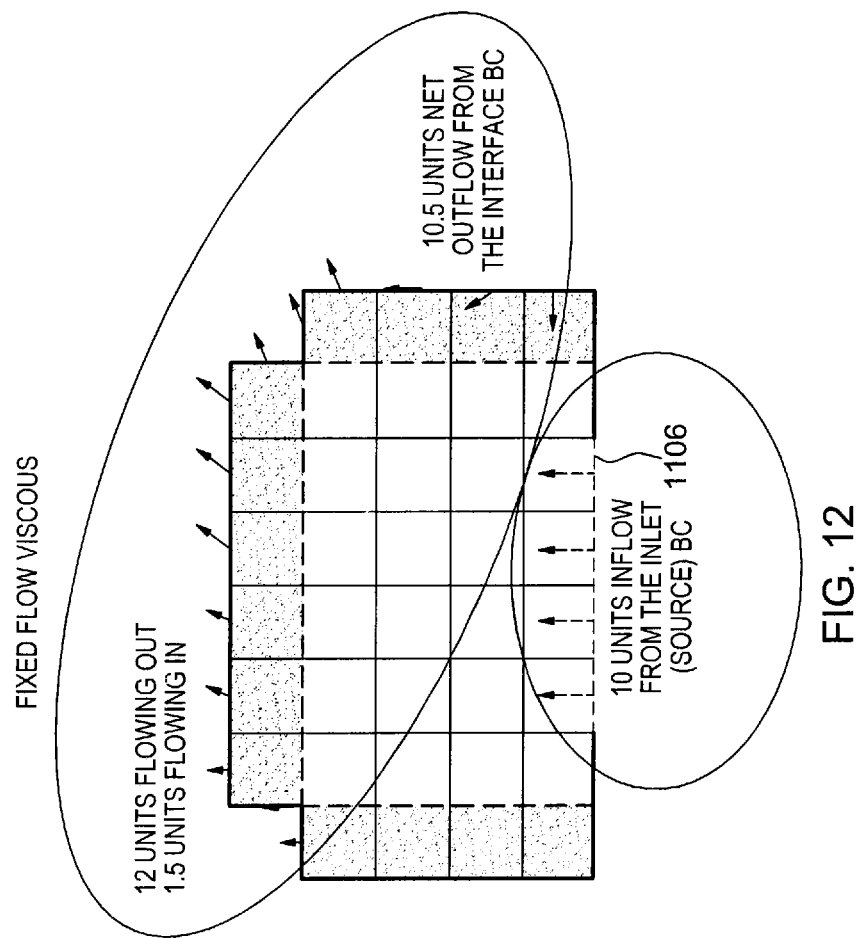
FIG. 12 depicts in greater detail one viscous region of the bounded domain example of FIG. 11, with exemplary, specified mass flow boundary conditions shown by arrows for use in fixed-flow computational fluid dynamics modeling of the bounded domain, in accordance with one or more aspects of the present invention.

FIG. 12 illustrates an issue using a viscous domain of FIG. 11, and provides exemplary vectors for the boundary conditions. The boundary conditions are specified across each cell face of the domain, allowing mass flow either into the domain, illustrated by an inward-facing arrow, or out of the domain, illustrated by an outward-facing arrow. In addition, the mass flow may have an X and Y component across the cell face or boundary. By way of example, the exemplary boundary conditions of FIG. 12 indicate that 10 units of mass in-flow is defined from the inlet or source boundary conditions 1106, and that there are 12 units of out-flow from the interface boundary conditions, as well as 1.5 units of mass inflow across the cells of the interface region defining the domain's boundary conditions, as illustrated. The result is a 10.5 unit net mass out-flow from the interface boundary conditions. Thus, the total mass flow into the exemplary domain of FIG. 12 is 11.5 units, while the total mass out-flow across the domain is 12 units, therefore, the net out-flow crossing the domain is 0.5 units. This difference is an issue in performing CFD modeling, and is addressed by the enhanced mass balancing process disclosed herein.

As noted, continuity or mass balance should be maintained throughout the domain being solved. Round-off and discretization errors within the domain prevent exact adherence to continuity across an arbitrary surface. Therefore, when performing CIVSM, continuity should be maintained for every viscous and inviscid domain being solved. Thus, boundary conditions will need to be modified from the original model in order to ensure global domain continuity for the viscous and inviscid domains.

As one approach, during the viscous domain solve and inviscid domain solve, or the updating of respective boundary conditions processing disclosed herein, mass balancing could be implemented by providing corrected boundary conditions using an equally-applied correction factor. For instance, this equally-applied correction factor could be a source/applied boundary condition correction factor. Using the example of FIG. 12, the total source boundary condition flow (e.g., ten units) may be determined, as well as the total applied boundary condition flow (e.g., 10.5 units across the interface region). The correction factor, in one example, may thus be defined by dividing the source and applied boundary conditions (10/10.5). Subsequently, all of the boundary conditions may be "mass balanced" by multiplying this correction factor by the originally specified value.

The advantage of such a mass balancing approach is that it is easy to implement. Disadvantageously, however, it may not be suitable for domains without a source, and applies correction factor updates to both incoming and outgoing flows equally, thereby increasing/decreasing the total flow crossing the boundaries. This mass balancing approach can also "over-correct", leading to potential instabilities and overall solution divergence.

Figure 13:
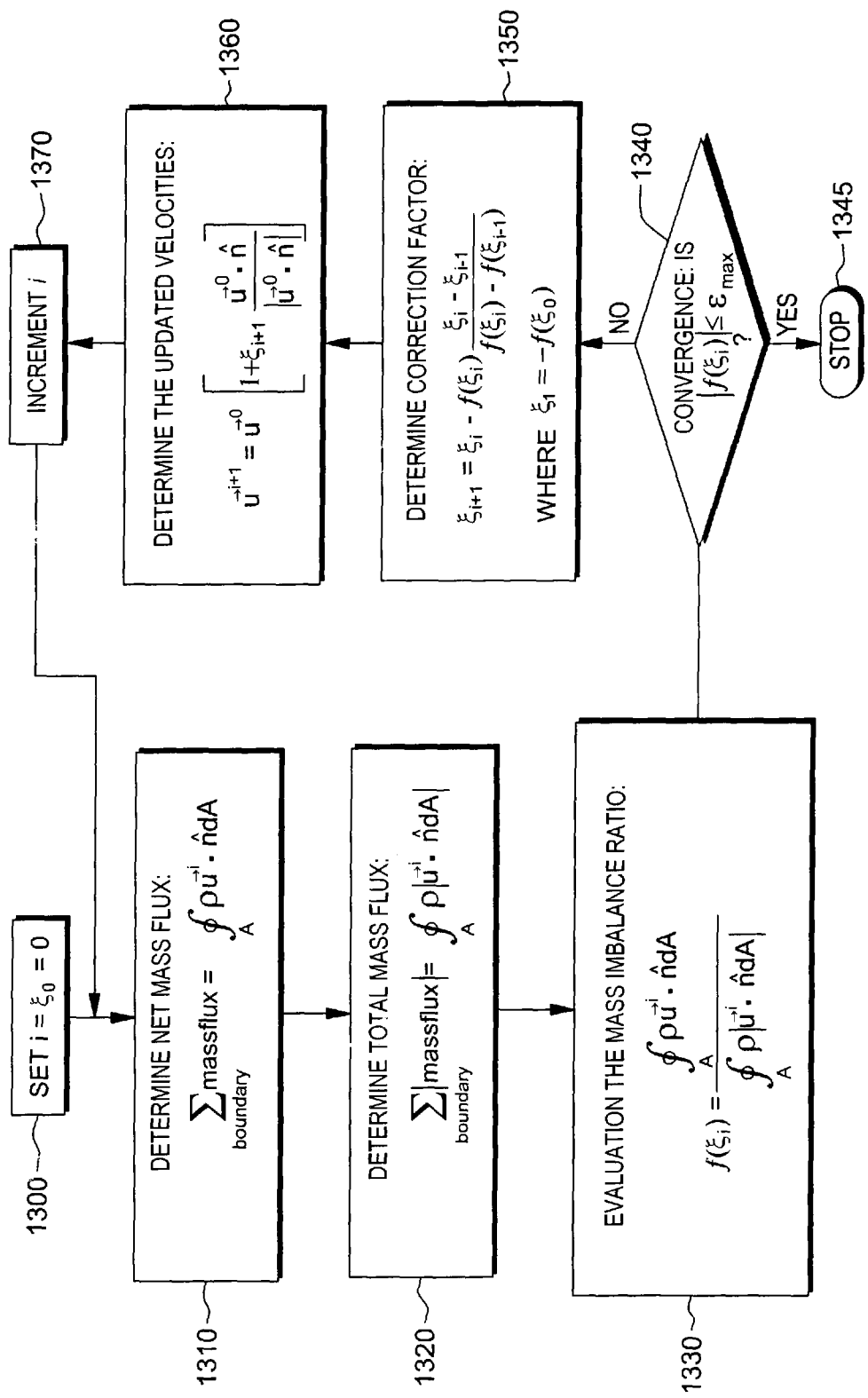
FIG. 13 depicts one embodiment of a mass balancing process for automatically adjusting mass flow boundary conditions that are specified for a bounded domain being modeled assuming fixed-flow conditions across the boundary, in accordance with one or more aspects of the present invention.

FIG. 13 depicts one embodiment of a novel mass balancing process or algorithm which may be used to satisfy continuity through the boundaries of the domain being solved. The process depicted advantageously minimizes the change in mass flux through each face area (e.g., cell boundary) of the flow boundaries between the domains. It also accounts for a non-conformal mesh between the different domains. Mass flux specified at other boundary conditions are not affected by the mass balancing approach disclosed in FIG. 13.

An iterative method is employed in the process diagram of FIG. 13, with the variables used including:

$\rho$=density;
$\bar{u}_i$=mean (time averaged) velocity vector from the Reynolds decomposition;
i=number of iterations of the Mass Balance Algorithm;
$\xi_i$=correction factor for iteration i of the Mass Balance Algorithm;
$\hat{n}$=unit normal vector for the face area;
dA=differential face area; and
$\varepsilon_{max}$=maximum allowable mass imbalance ratio (e.g., $10^{-9}+10^{-6}*|\xi_1|$).

As illustrated in FIG. 13, an iteration counter "i" is initialized to zero, and the initial correction factor $\xi_0$ is initialized 1300. Note that the correction factor "$\xi_i$" represents the correction factor for the $i^{th}$ iteration. The net mass flux or flow across the boundaries of the domain is determined 1310, as well as the total mass flow across the boundaries of the domain being solved 1320. Mathematical expressions for these respective determinations are provided in FIG. 13. Note that in one or more implementations, the net mass flow (or flux) across the boundaries of the domain may be determined with net flow being positive for flow exiting the domain, and negative for flow entering the domain (by way of example only).

A mass imbalance ratio is then determined by dividing the net mass flux or flow by the total mass flux or flow 1330. The mathematical expression of this imbalance ratio is shown as $f(\xi_i)$ in FIG. 13, which means that the mass imbalance ratio is a function of the correction factor. The absolute value of the mass imbalance ratio is then compared to a convergence or stopping criterion ($\varepsilon_{max}$) 1340. The convergence or stopping criterion ($\varepsilon_{max}$) should be small enough to ensure stability of the solution, and may be, for instance, on the order of the discretization error. If the mass balance ratio is less than the convergence criterion, then mass balancing processing terminates 1345, that is, the iterating through the mass balancing process of FIG. 13 is complete. Otherwise, if the mass imbalance ratio is greater than the convergence criterion, then a new correction factor ($\xi_{i+1}$) is determined using a root finding process or algorithm, such as the secant method 1350. As understood by one skilled in the art, the secant method is a quasi-Newton method for determining roots to a function. The method finds the correction factor that reduces the mass imbalance across the ratios to nearly zero, and is essentially a first order finite difference of Newton's method. The method offers super-linear convergence with minimal calculation, and a number of iterations may be required to converge to the convergence criterion. Alternatively, Newton's method could be employed in determining the updated correction factor.

Note that for the processing described herein, the first iteration of the correction factor may simply be the negation of the imbalance ratio, that is, if net flow is into the domain, then the correction factor, CF, is positive, and if net flow is out of the domain, then the correction factor, CF, is negative. Subsequent correction factors may be determined, as illustrated in FIG. 13, using, for instance, the secant method, which (as noted) provides super-linear convergence, requires minimal storage, and does not necessitate any additional mass imbalance evaluations.

The updated correction factor is then used to adjust the magnitude of the velocities at the flow boundaries 1360. Note that the process depicted always modifies the magnitude of the velocities in the direction that decreases the net mass flow through the boundary. The magnitude of the velocities is either increased or decreased, depending on whether the net mass flow through the boundary is positive or negative, and whether the flow direction of the individual velocity is into or out of the domain. For example, if the net mass flow is into the domain, and a particular boundary velocity is also into the domain, then the velocity is reduced in magnitude. In particular, if mass flow is entering the domain, then the updated velocity is equal to the initial specified velocity multiplied by the sum of (1−CF). However, if a particular boundary velocity is out of the domain, then that velocity is increased in magnitude. For instance, the updated velocity is set to equal the initial specified velocity multiplied by the sum of (1+CF). In this manner, the overall change in the velocities along the interface regions is minimized, and any other boundary conditions are not affected. After updating the velocities, the iteration counter "i" is incremented 1370, and processing returns to determining the net mass flow, as well as total mass flow or flux across the boundary. The iterative process continues until the mass imbalance ratio meets the convergence or stopping criterion, $\varepsilon_{max}$. In practice, the processing illustrated may require a few iterations, such as 2-5, to converge to the stopping criterion.

Advantageously, using the enhanced mass balancing approach of FIG. 13, the correction factor is applied such that the percentage change for each vector flow is minimized. In particular, out-flow from the bounded domain is increased, and in-flow is decreased for net in-flow, and in-flow is increased and out-flow decreased, for net out-flow. This decreases error propagation and allows for solution convergence. Further, this approach does not require the domain to have a source, as in the source/applied boundary condition approach noted above.

Figures 14A, 14B:
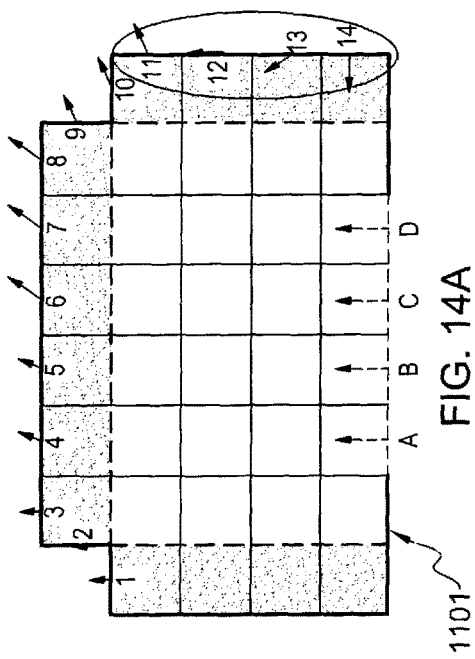
FIG. 14A depicts the bounded domain example of FIG. 12, with exemplary mass flow vectors depicted at the different cells at the boundary of the bounded domain, in accordance with one or more aspects of the present invention.
FIG. 14B is a table of exemplary mass flow or flux values across selected cell faces (i.e., cells 11-14) of the boundary of FIG. 14A, and illustrating the mass flow boundary conditions after correction using an equally-applied correction factor, compared to the enhanced mass balancing approach of FIG. 13, in accordance with one or more aspects of the present invention.

By way of example, FIGS. 14A & 14B depict the bounded domain of the example of FIGS. 11 & 12, with each cell faces 11-14 being assigned respective magnitudes to the illustrated velocity arrows (see original boundary conditions in FIG. 14B). In FIG. 14B, in addition to exemplary boundary conditions for cell faces 11-14, corrected boundary condition values using the source/applied correction factor approach, in comparison with the enhanced mass balancing approach or algorithm of FIG. 13 are provided. As illustrated in Table 14B, using the source/applied correction factor approach, all the vectors shrink in length, while the enhanced mass balancing approach of FIG. 13, only the velocities leaving the boundary are reduced, with velocities entering the boundary increasing. This can be seen by comparing the new mass flux values for the cell faces ascertained between the different mass balancing approaches.

Although the simple scaling of the velocities using the source/supplied correction factor simplifies the process, it can lead to divergence of the solution. Divergence occurs when the velocity factors are altered by a high correction factor on the first, outer viscous-iteration of the CIVSM approach, which has to account for the non-conformal mesh between the different domains. Subsequent correction factors ultimately amplify any initial velocity vector modification, until the correction factors become so high that the solution diverges. Minimizing the change in the velocity vectors using the mass balancing approach of FIG. 13 advantageously avoids the divergence mechanism of over-correcting the velocity vectors.

Note that, with respect to the boundary conditions, unlike the mass balancing process for a continuity equation, no additional algorithm or process is required in order to alter the boundary conditions to satisfy the energy equation. For instance, the energy equation may be satisfied by using an upwind discretization approach that ignores the temperature boundary conditions, where the flow is exiting the domain. This may be done in order to not over-specify the problem, and constrain the solution. No specific algorithm is necessary for the energy equation beyond removing the strict enforcement of the temperature specification for flow exiting the domain, which is fulfilled in the upwind discretization approach.

Those skilled in the art should note that the mass balancing approach described herein and illustrated, for instance, in FIG. 13, may be generally applied to solving of any bounded domain, and is not limited to domains such as the viscous solve domain and inviscid solve domain ascertained using the CIVSM approach described herein.

Thus, generally stated, methods, computer systems, and computer program products are disclosed herein, in one or more aspects, which include performing computational fluid dynamics modeling of a bounded domain. The performing includes solving iteratively a computational fluid dynamics model of the bounded domain using mass flow boundary conditions that are specified where initially fixed. The solving includes automatically adjusting the mass flow boundary conditions for at least one iteration of the solving. The automatically adjusting includes mass balancing flows at a boundary of the bounded domain. This mass balancing of flows includes applying different corrections to mass in-flows across the boundary into the bounded domain, compared with mass out-flows across the boundary from the bounded domain. In this manner, the method minimizes the change in mass flux or flow through the different areas of the boundary.

In one or more implementations, the results of the solving may be used to automatically reconfigure or adjust one or more features of the bounded domain. For instance, where the bounded domain is a data center, the results of the computational fluid dynamics modeling may be employed to evaluate different data center layouts of electronics racks, computer room air-conditioning units, perforated tiles, etc., within the data center. The mass balancing approach disclosed herein advantageously facilitates the computational fluid dynamics modeling process.

In one or more embodiments, the mass balancing includes, for at least one automatic adjusting of the mass flow boundary conditions, multiplying any mass in-flow across the boundary by (1−CF), and multiplying any mass out-flow across the boundary by (1+CF), where CF is a determined correction factor, and net mass flow is positive for mass out-flow exiting the bounded domain, and negative for mass in-flow entering the bounded domain. One automatic adjusting of the at least one automatic adjusting, such as the initial adjustment, may utilize a determined correction factor which includes the net mass in-flow into the bounded domain across the boundary divided by the total mass flow cross the boundary of the bounded domain.

In certain embodiments, the mass balancing may further include, for at least one automatic adjusting of the mass flow boundary conditions, using a zero-finding algorithm to update the mass flow boundary conditions for use in the at least one solving iteration of the computational fluid dynamics model.

Note also, in one or more embodiments, the mass balancing may include automatically determining a current mass imbalance ratio, and ascertaining whether the current mass imbalance ratio is less than or equal to a defined maximum allowable mass imbalance ratio. The mass balancing may be terminated where the current mass imbalance ratio is less than or equal to the defined maximum allowable mass imbalance ratio.

As noted herein, performing computational fluid dynamics modeling of the bounded domain may include, in one or more implementations, processing the bounded domain to automatically locate within the bounded domain at least one viscous region and at least one inviscid region. In these implementations, solving the computational fluid dynamics model includes separately evaluating the at least one viscous region and the at least one inviscid region by iteratively performing: viscous domain solve for the at least one viscous region using viscous mass flow boundary conditions that are specified for a viscous solve boundary associated with the at least one viscous region; and inviscid domain solve for the at least one inviscid region using inviscid mass flow boundary conditions that are specified for an inviscid solve boundary associated with the at least one inviscid region. The separately evaluating includes separately automatically adjusting the viscous mass flow boundary conditions and the inviscid mass flow boundary conditions for the viscous domain solve and the inviscid domain solve, respectively, for at least one viscous domain solve iteration and at least one inviscid domain solve iteration.

In certain implementations that utilize partitioning of the bounded domain as summarized above, then the mass balancing may include, for at least one automatic adjusting of the viscous mass flow boundary conditions, multiplying any mass in-flow across the viscous solve boundary by $(1-CF_v)$, and multiplying any mass out-flow across the viscous solve boundary by $(1+CF_v)$, where $CF_v$ is a determined viscous solve correction factor, and net mass flow is positive for mass out-flow exiting the at least one viscous region, and negative for mass in-flow entering the at least one viscous region, and the mass balancing further includes, for at least one automatic adjusting of the inviscid mass flow boundary conditions, multiplying any mass in-flow across the inviscid solve boundary by $(1-CF_{in})$, and multiplying any mass out-flow across the inviscid solve boundary by $(1+CF_{in})$, where $CF_{in}$ is a determined inviscid solve correction factor, and net mass flow is positive for mass out-flow exiting the at least one inviscid region, and negative for mass in-flow entering the at least one inviscid region. In certain implementations, for one automatic adjusting, such as the initial automatic adjusting, of the viscous mass flow boundary conditions, the determined viscous solve correction factor $CF_v$ may comprise net mass in-flow into the at least one viscous region across the viscous boundary divided by total mass flow across the viscous solve boundary of the at least one inviscid region, and wherein for an automatic adjusting, such as the initial automatic adjusting, of the inviscid mass flow boundary conditions, the determined inviscid solve correction factor $CF_{in}$ may comprise net mass in-flow across the inviscid solve boundary divided by total mass flow crossing the inviscid solve boundary of the at least one inviscid region.

Continuing with the overview process of FIG. 4, processing next performs an update of boundary conditions 430 to update the inviscid boundary conditions across the interface region(s) from the viscous domain at time step (n) to the inviscid domain at time step (n). One embodiment of this processing is depicted in FIG. 15.

As shown, the boundary conditions are set, except along the interface region(s) for the inviscid domain solve(s) 1500. Boundary conditions along the interface regions for the inviscid domain solve are then set using the results from the viscous domain solve at time step (n) 1505. If time step (n) is other than zero, then the solution for the inviscid domain solve is initialized using the results from the previous inviscid domain solve at time step (n−1) 1510.

Figures 15, 16A:
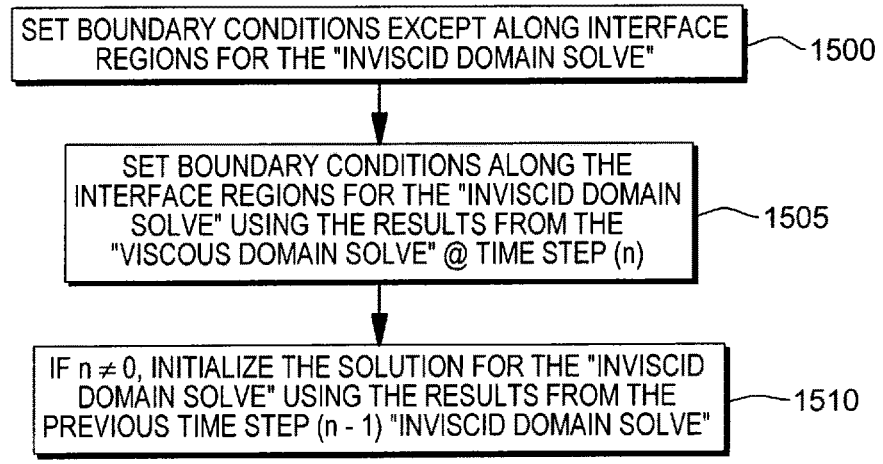
FIG. 15 illustrates one embodiment of a first update boundary conditions process (along the interface region(s) for the inviscid domain solve) for the computational fluid dynamics modeling approach of FIG. 4, in accordance with one or more aspects of the present invention.
FIG. 16A depicts one embodiment of an inviscid domain solve process for the computational fluid dynamics modeling approach of FIG. 4, in accordance with one or more aspects of the present invention.

One embodiment of the inviscid domain solve process 435 of FIG. 4 is depicted in FIG. 16A, wherein the solve for the inviscid solve regions occurs using the set of inviscid equations and a multi-grid method (whether V, W, or FMG method) with the medium multi-grid mesh (e.g., grids 7-9) 1600.

Figure 16B:
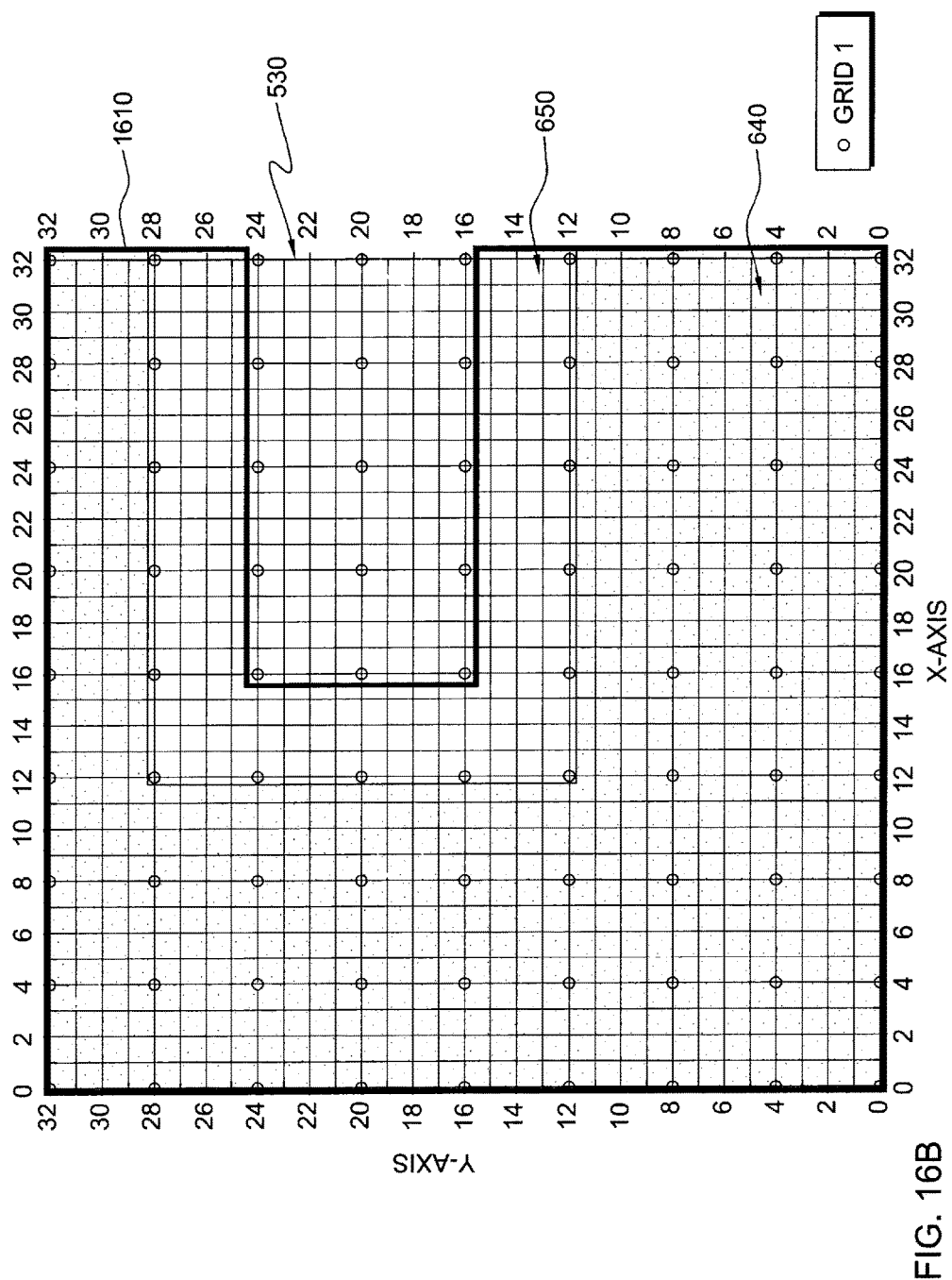
FIG. 16B depicts the 2-D bounded domain, and illustrates one example of the inviscid region and interface region, along with a boundary for boundary conditions for the inviscid domain solve process, in accordance with one or more aspects of the present invention.

FIG. 16B depicts one embodiment of the domain 530 and the inviscid solve region comprising the one or more inviscid region(s) 640, and the one or more interface region(s) 650. The figure illustrates the boundary 1610 for the inviscid region's boundary conditions.

Figure 16C:
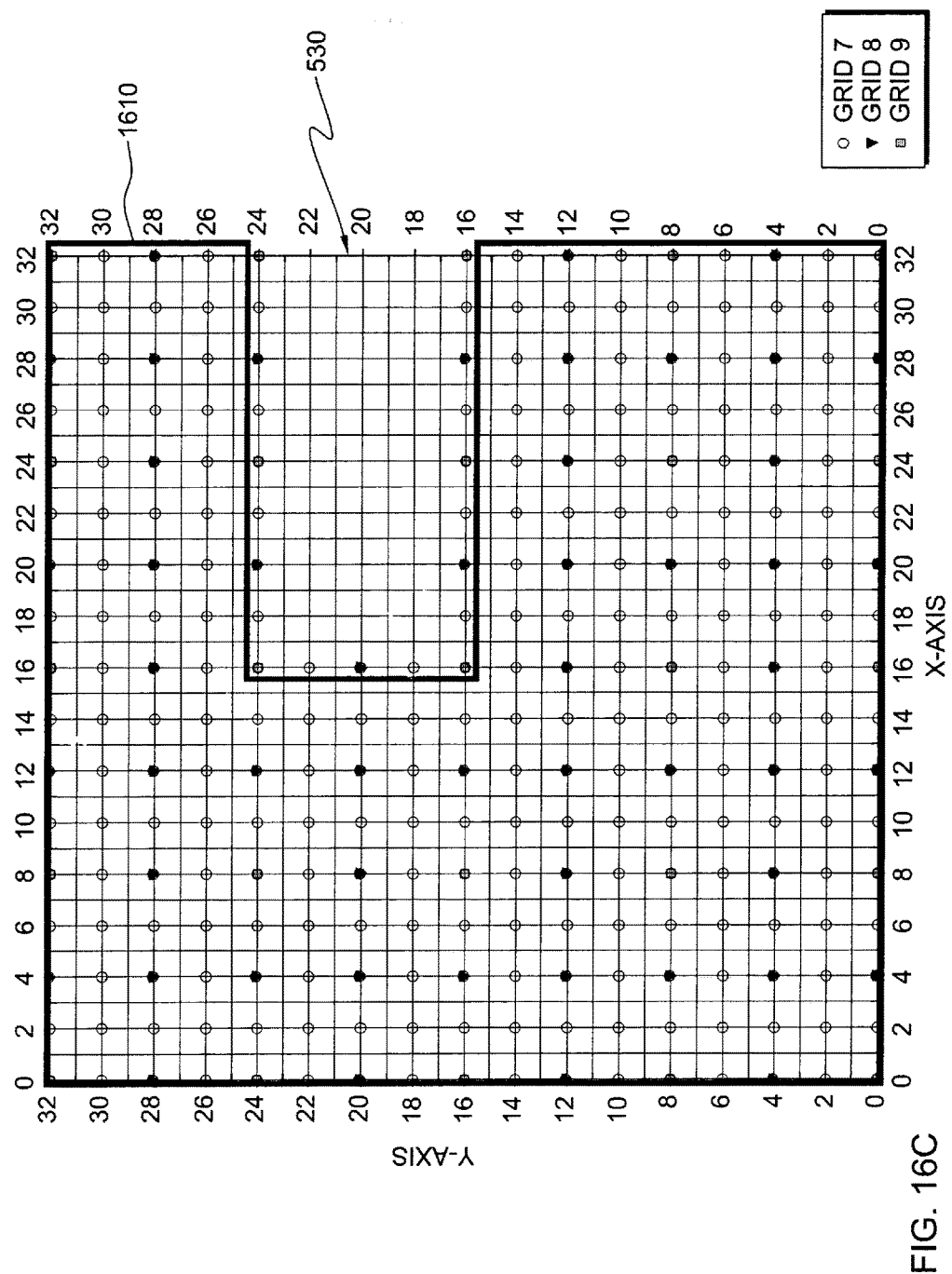
FIG. 16C depicts the 2-D bounded domain of FIG. 16B, and illustrates a medium multi-grid mesh for use in the inviscid domain solve of the inviscid region and interface region using a set of inviscid equations, in accordance with the processing of FIG. 16A, and in accordance with one or more aspects of the present invention.

In FIG. 16C, one embodiment of a medium multi-grid mesh (grids 7-9) is illustrated. By way of example, in one embodiment, the medium multi-grid mesh is more dense than the coarse multi-grid mesh employed in the initial and second solves, and is coarser than the dense (fine) multi-grid mesh employed in the viscous domain solve.

Figure 17:
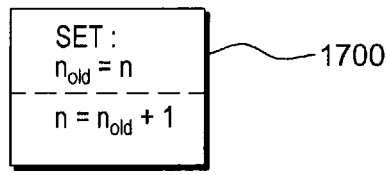
FIG. 17 depicts one embodiment of a process for incrementing a time step (n) employed in the computational fluid dynamics modeling approach of FIG. 4, in accordance with one or more aspects of the present invention.

Continuing with the process of FIG. 4, after the inviscid domain solve 435, a determination is made whether overall conveyance criteria have been met 440, for instance, whether time step (n) has reached a predefined maximum time step ($n_{max}$). If "no", then the time step (n) is incremented 445 by, for example, setting time step ($n_{old}$) equal to time step (n), and then incrementing the old time step ($n_{old}$) to arrive at a new time step (n) 1700, as shown in FIG. 17. Processing then updates the viscous boundary conditions 450 to update boundary conditions across the interface region(s), from the inviscid domain at time step (n−1), to the viscous domain at time step (n).

Figure 18:
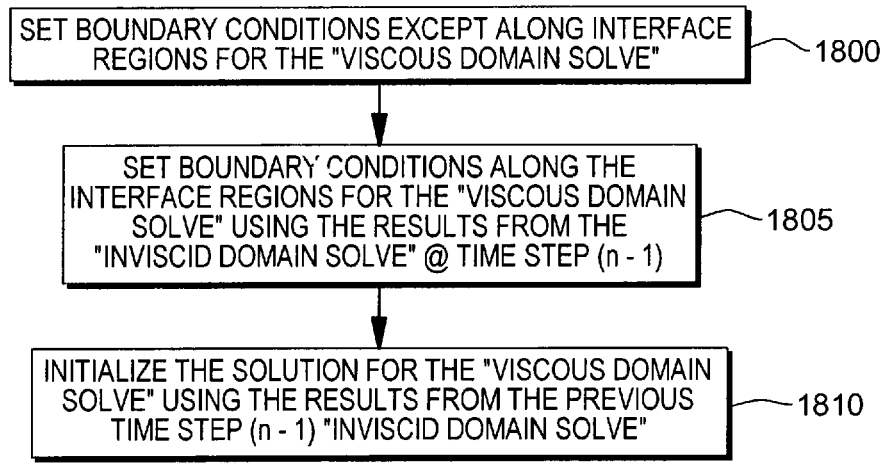
FIG. 18 depicts one embodiment of a second update boundary conditions process (along the interface region for the viscous domain solve) for the computational fluid dynamics modeling approach of FIG. 4, in accordance with one or more aspects of the present invention.

FIG. 18 depicts one embodiment of a second update of boundary conditions, wherein boundary conditions are initially set, except along the interface regions for the viscous domain solve 1800. Boundary conditions are then set along the interface regions for the viscous domain solve using the results from the inviscid domain solve at time step (n−1) 1805, and the solution for the next iteration of the viscous domain solve is initialized using the results from the previous time step (n−1) viscous domain solve 1810.

As shown in FIG. 4, as part of the convergence, multiple iterations through the viscous domain solve, update boundary inviscid conditions, inviscid domain solve, increment time step (n), and update viscous boundary conditions, may occur until (in one example) time step (n) has reached a maximum defined time step ($n_{max}$). Depending upon the implementation, convergence might be defined via a time step ($n_{max}$) that is any set number of iterations, for example, 10, 100 or 1,000, etc. iterations. Once time step (n) has reached the maximum defined time step ($n_{max}$), then it may be assumed that the results for the viscous domain solve and the inviscid domain solve have each obtained convergence, and the results of the two solves are provided as the solution 455, which completes the computational fluid dynamics modeling of the bounded domain 460.

Numerous variations or enhancements to the above-described modeling process are possible. For example, while iterating through the viscous domain solve and inviscid domain solve until time step (n) has reached the maximum defined time step ($n_{max}$), the bounded domain could be re-divided into a different viscous region(s) and a different inviscid region(s), after which the viscous domain solve may be performed for the different viscous region(s) using the turbulence model, and the inviscid domain solve may be performed for the different inviscid region(s) using the set of inviscid equations.

Figure 19:
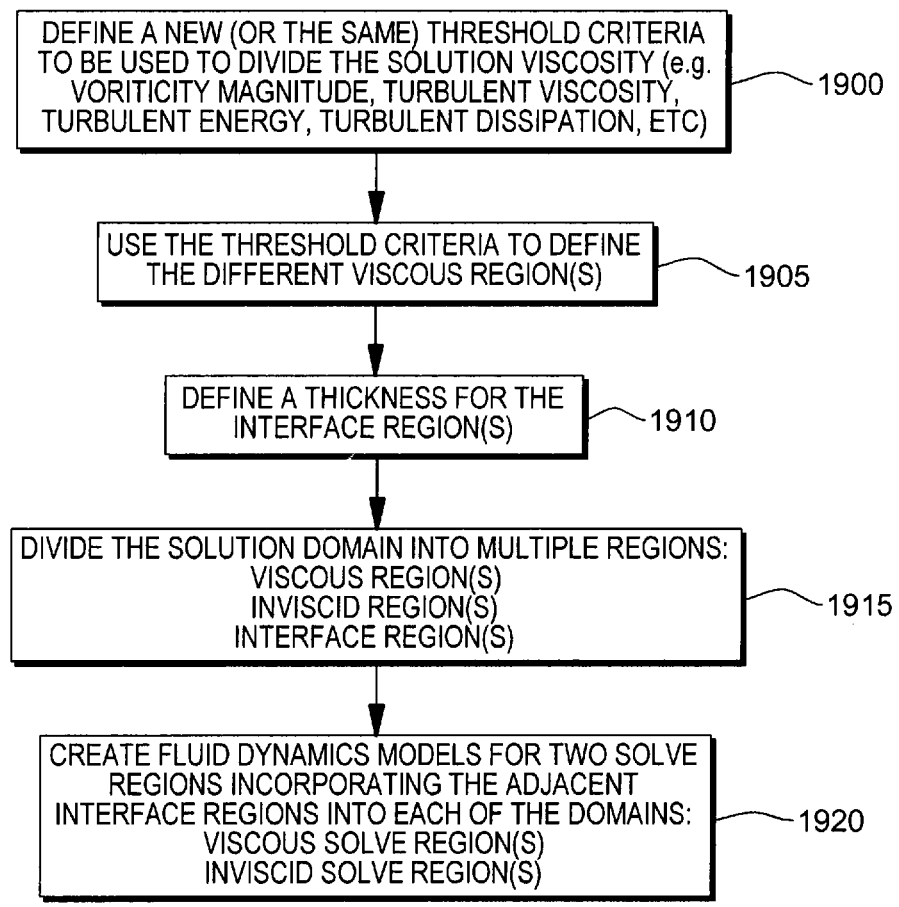
FIG. 19 depicts one embodiment of an optional process for adapting the viscous region(s), inviscid region(s) and interface region(s) in the solution domain of the computational fluid dynamics modeling approach of FIG. 4, in accordance with one or more aspects of the present invention.

One example of such a process is depicted in FIG. 19. Re-dividing the bounded domain can include defining a new (or the same) threshold criteria to be used in dividing the solution domain 1900. As described above, the threshold criteria is (in one example) a set threshold for a turbulence characteristic associated with the cells of one of the multi-grid meshes, and may comprise a vorticity magnitude, a turbulent kinetic energy characteristic, a turbulent dissipation characteristic, etc. The threshold criteria is then used to define one or more different viscous regions 1905. A thickness of the interface region is defined 1910, and the solution domain is divided into multiple regions, that is, one or more viscous regions, one or more inviscid regions, and one or more interface regions 1915. The fluid dynamic models for the different solve regions are created incorporating the adjacent interface regions into each of the solve domains to arrive at a viscous solve region(s) and an inviscid solve region(s) 1920.

As another option, the one or more grids employed in the viscous domain solve and the one or more grids employed in the inviscid domain solve may be dynamically adapted between iterations through the viscous domain solve and inviscid domain solve by, for example, increasing grid density where desired, and removing grid density where not needed based on, for example, velocity or temperature magnitudes or velocity or temperature gradients.

Figure 20:
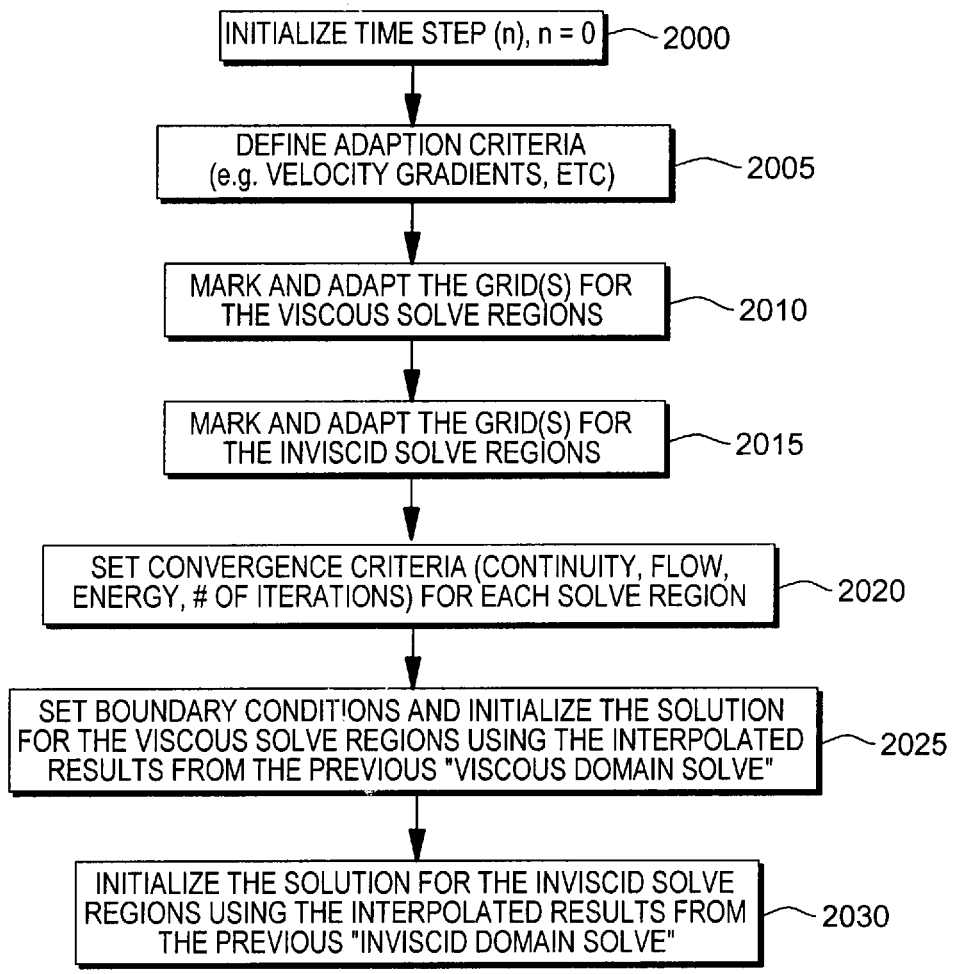
FIG. 20 depicts one embodiment of an optional process for adapting one or more grids employed in the viscous domain solve or inviscid domain solve processing of the computational fluid dynamics modeling approach of FIG. 4, in accordance with one or more aspects of the present invention.

FIG. 20 depicts one embodiment of a process for adapting the grid(s). This processing includes initialing time step (n) to zero 2000, and defining an adaption criteria, such as a velocity gradient, temperature gradient, velocity magnitude, or temperature magnitude, etc. 2005. Once the adaption criteria is met, one or more grids for the viscous solve region(s) are adapted 2010, and/or one or more grids for the inviscid solve region(s) are adapted 2015. The convergence criteria for each solve region is set 2020, as well as the boundary conditions, and the solution for the viscous solve region(s) is initialized using the interpolated results from the previous viscous domain solve 2025 (which is assumed to have used a different grid). Similarly, the solution for the inviscid solve region(s) is initialized using interpolated results from the previous inviscid domain solve 2030.

Additional variations on the computational fluid dynamics modeling processes disclosed herein may include changing the number of iterations before incrementing the time step, potentially running multiple viscous/inviscid loops for higher accuracy, and/or using more stringent convergence criteria for subsequent iterations. In the case of transient boundary conditions, the model's boundary conditions could be changed at various time steps during the processing. The energy equation (noted above) can be run from the beginning and for every iteration (slowest approach, but accurate), or only after a certain number of iterations (slightly faster), or only after the flow solution is converged (fastest, but least accurate), or only at certain iterations, keeping the temperature field fixed between updates (fast and accurate). The above-described method assumes a non-conformal grid at the interface regions. Alternatively, a conformal grid could be employed, which could increase computational speed during boundary condition updates, but may significantly slow inviscid domain solve speed, or decrease viscous domain accuracy.

Further variations might include providing different multi-grid method parameters. That is, the chosen multi-grid method and parameters could be changed for each of the solution steps. The interface regions could be dynamically adjusted based, for example, on vorticity magnitude for new grid solutions. The criteria for selecting regions could be changed. Other criteria could be used besides vorticity magnitude, as described above. A conservative criteria could significantly increase the solve time, but a too-aggressive criteria would decrease solution accuracy. As noted above, different turbulence models could be employed for different viscous regions of the bounded domain. Certain viscous regions may be more accurately modeled with different turbulence models, and subsequently, multiple turbulence models could be used for the different viscous regions. The viscous regions could be specified a priori by defining regions for certain turbulence models before beginning the computation; or in situ, by either defining parameters in which to select the turbulence model based on the flow conditions, or placing an additional step in the processing flow, after dividing the solution domain, for the user to define each viscous region's turbulence model. In addition, the initial solve with the inviscid equations could be omitted, with the initial solve going straight to the second solve described above, which employs one or more turbulence models.

Those skilled in the art will note that, presented herein is a method of solving a computational fluid dynamics (CFD) model of a bounded domain, such as a data center, which includes using inviscid equations with a coarse multi-grid. Once convergence is reached, the model can be re-solved with a basic turbulence model, with the previously-obtained inviscid solution being employed as the initial solution to the second solve. Subsequent to the second solve, the model's domain may be automatically partitioned into multiple regions, as described herein. A new, fine multi-grid may be created for each of these viscous solve regions. Similarly, inviscid regions may be defined by combining adjacent cells with turbulence characteristics less than the threshold criteria, and a new medium multi-grid may be created for each of these inviscid solve regions. Interface regions may be defined as overlap regions that include (in one example) at least one level deep of each of the new grids (i.e., the viscous and inviscid grids) located at the boundaries between the viscous regions and the inviscid regions. The interface regions are used to pass boundary conditions back and forth between the two solvers.

Processing initializes the time step counter to zero, and performs a next solve for the CFD model over the viscous domain using the desired turbulence model and using the previous coarse grid, basic turbulence model solution as an initial solution. A multi-grid method is employed to speed convergence. The boundary conditions from the interface regions may be employed with the solution from the coarse grid, basic turbulence model.

Once the model has converged, the boundary conditions may be updated across the interface regions on the new, finer grid. Next, the CFD model is solved over the inviscid domain using, for instance, a multi-grid method and the previously-defined, medium multi-grid mesh, with the basic turbulence model solution as an initial solution. The boundary conditions for the interface regions that were just updated from the viscous solve regions may be employed in the inviscid domain solve. After convergence, the time step is evaluated to determine whether a maximum time step has been reached, and if so, the results of the viscous and inviscid domain solves are assembled to provide a bounded domain model. If not, then the time step (n) is incremented, and processing continues for another iteration. Each subsequent iteration includes, in one example, four steps before checking the counter again, and either ending the routine or incrementing the counter. The first step is to update the boundary conditions across the interface regions from the previous solution to the inviscid domain solve. Next, the viscous domain solve occurs for the new time step using the new, updated boundary conditions and the previous time step solution to the viscous domain solve as the initial solution. Once completed, the same two operations are applied to the interface regions from the viscous solver, and a new time step inviscid domain solve is performed in a similar manner to the viscous domain solve.

Advantageously, the methods disclosed herein reduce solve time compared to a viscous-only solve of a CFD model. Further, the hybrid methods increase accuracy compared to inviscid-only solves. The methods provide a potential trade-off between overall solution accuracy and solve time, dependent upon, for example, the turbulence characteristic criterion selected. Numerous alternative embodiments are possible to further improve accuracy and/or reduce solve time over static models. These include multiple solving loops, tightening of convergence criteria, judicious use of the energy equation, adaptive and non-conformal grids, different multi-grid method parameters, dynamic interface regions, and the use of multiple turbulence models in association with multiple viscous regions. The methods could be employed to solve particular regions of interest with high accuracy, while significantly reducing the overall computational time. Transient solutions can realistically be explored in a timely manner.

One significant step in the CIVSM approach to producing an internal model of a bounded domain, such as a data center, is the partitioning process employed in automatically locating within the bounded domain the viscous region(s). In one approach, the viscous region(s) may be located based on a threshold criteria of a turbulence characteristic. For instance, one or more viscous regions could be defined by combining adjacent cells with (for example) turbulence characteristic magnitudes greater than a defined threshold criteria.

As enhancements, improved performance may be obtained by employing a partitioning approach such as depicted in FIGS. 7-8H, as well as mass balancing as discussed above in connection with FIGS. 11-14B. Using these enhancements, CIVSM modeling may be employed to facilitate enhanced data center layout by, for instance, allowing more data center potential layouts and scenarios to be run and evaluated. Thus, the CIVSM approach enables inefficiencies and weaknesses in a data center layout to be better evaluated, with the resultant data center being optimized for, for instance, energy efficiency. This in turn enhances data center processing equipment reliability by reducing, for instance, inlet air temperatures to the equipment. The faster modeling solutions disclosed herein also permit transient analysis within the data center, allowing, for instance, failure analysis to be performed on various pieces of equipment, and fault tolerances of different designs to be evaluated. The CIVSM approach with partitioning and/or mass balancing as disclosed herein advantageously allows recirculation within the data center to be modeled, to allow options to be explored, such as electronic rack placement to reduce recirculation, as well as to minimize localized hot spots within a data center.

Figure 21:
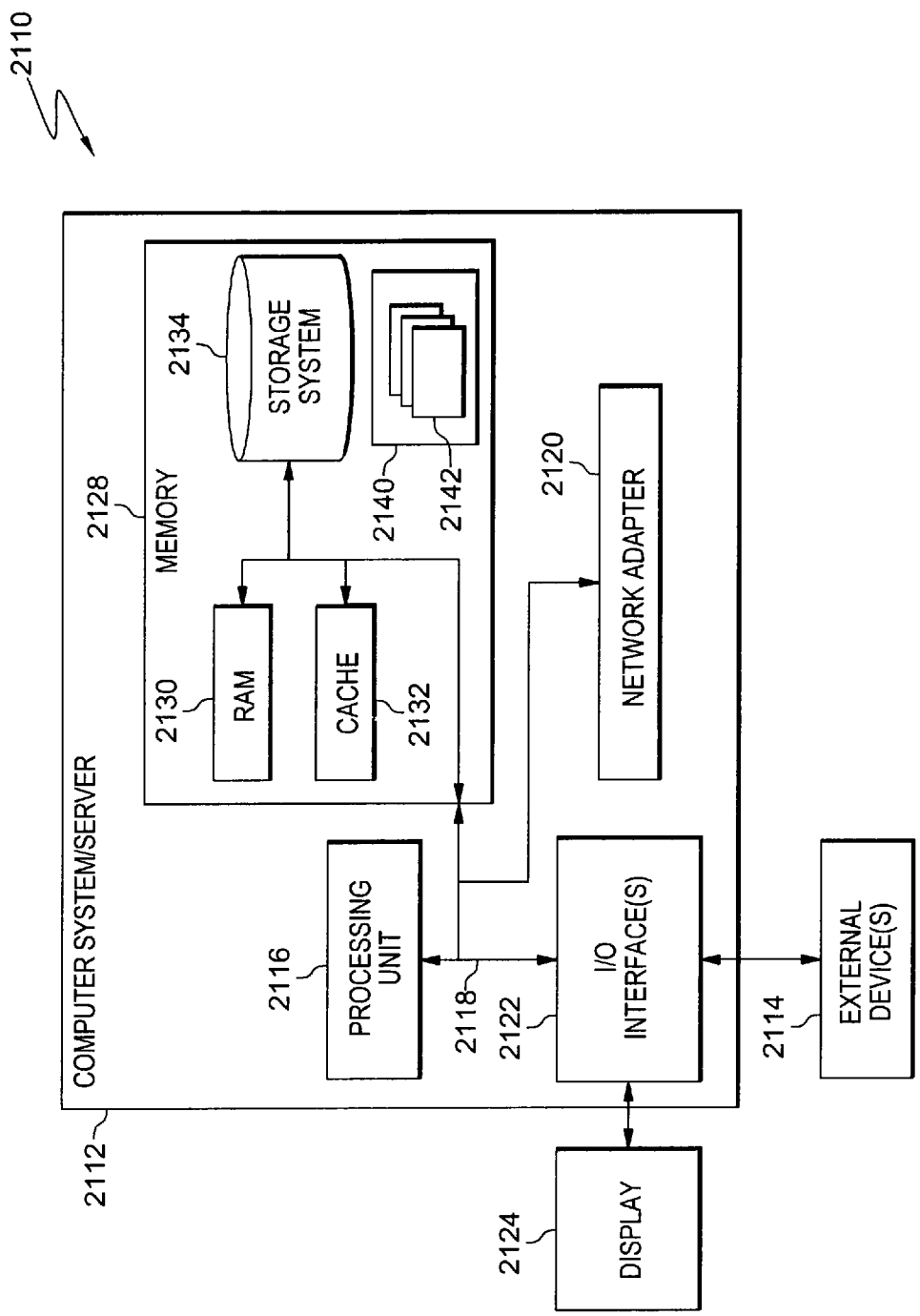
FIG. 21 depicts one embodiment of a data processing system to implement one or more aspects of the present invention.

Referring now to FIG. 21, a schematic of an example of a data processing system 2110 is shown. Data processing system 2110 is only one example of a suitable data processing system and is not intended to suggest any limitation as to the scope of use or functionality of embodiments of the invention described herein. Regardless, data processing system 2110 is capable of being implemented and/or performing any of the functionality set forth herein above, such as the CIVSM approach, including the partitioning functionality discussed.

In data processing system 2110 there is a computer system/server 2112, which is operational with numerous other general purpose or special purpose computing system environments or configurations. Examples of well-known computing systems, environments, and/or configurations that may be suitable for use with computer system/server 2112 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 2112 may be described in the general context of computer system executable instructions, such as program modules, being executed by a computer system. Generally, program modules may include routines, programs, objects, components, logic, data structures, and so on that perform particular tasks or implement particular abstract data types. Computer system/server 2112 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 21, computer system/server 2112 in data processing system 2110 is shown in the form of a general-purpose computing device. The components of computer system/server 2112 may include, but are not limited to, one or more processors or processing units 2116, a system memory 2128, and a bus 2118 that couples various system components including system memory 2128 to processor 2116.

Bus 2118 represents one or more of any of several types of bus structures, including a memory bus or memory controller, a peripheral bus, an accelerated graphics port, and a processor or local bus using any of a variety of bus architectures. By way of example, and not limitation, such architectures include the Industry Standard Architecture (ISA), Micro Channel Architecture (MCA), Enhanced ISA (EISA), Video Electronics Standards Association (VESA), and Peripheral Component Interconnect (PCI).

Computer system/server 2112 typically includes a variety of computer system readable media. Such media may be any available media that is accessible by computer system/server 2112, and it includes both volatile and non-volatile media, removable and non-removable media.

System memory 2128 can include computer system readable media in the form of volatile memory, such as random access memory (RAM) 2130 and/or cache memory 2132. Computer system/server 2112 may further include other removable/non-removable, volatile/non-volatile computer system storage media. By way of example only, storage system 2134 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 2118 by one or more data media interfaces. As will be further depicted and described below, memory 2128 may include at least one program product having a set (e.g., at least one) of program modules that are configured to carry out the functions of embodiments of the invention.

Program/utility 2140, having a set (at least one) of program modules 2142, may be stored in memory 2128 by way of example, and not limitation, as well as an operating system, one or more application programs, other program modules, and program data. Each of the operating system, one or more application programs, other program modules, and program data or some combination thereof, may include an implementation of a networking environment. Program modules 2142 generally carry out the functions and/or methodologies of embodiments of the invention as described herein.

Computer system/server 2112 may also communicate with one or more external devices 2114 such as a keyboard, a pointing device, a display 2124, etc.; one or more devices that enable a user to interact with computer system/server 2112; and/or any devices (e.g., network card, modem, etc.) that enable computer system/server 2112 to communicate with one or more other computing devices. Such communication can occur via Input/Output (I/O) interfaces 2122. Still yet, computer system/server 2112 can communicate with one or more networks such as a local area network (LAN), a general wide area network (WAN), and/or a public network (e.g., the Internet) via network adapter 2120. As depicted, network adapter 2120 communicates with the other components of computer system/server 2112 via bus 2118. It should be understood that although not shown, other hardware and/or software components could be used in conjunction with computer system/server 2112. Examples, include, but are not limited to: microcode, device drivers, redundant processing units, external disk drive arrays, RAID systems, tape drives, and data archival storage systems, etc.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of aspects of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form contain, such as "contains" and "containing") are open-ended linking verbs. As a result, a method or device that "comprises", "has", "includes" or "contains" one or more steps or elements possesses those one or more steps or elements, but is not limited to possessing only those one or more steps or elements. Likewise, a step of a method or an element of a device that "comprises", "has", "includes" or "contains" one or more features possesses those one or more features, but is not limited to possessing only those one or more features. Furthermore, a device or structure that is configured in a certain way is configured in at least that way, but may also be configured in ways that are not listed.

The descriptions of the various embodiments of aspects of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method to produce a data center layout, the method comprising:

providing a data center including an air-conditioning unit, and one or more electronic racks;

producing a data center layout optimized for data center energy efficiency, the data center being a bounded domain, and the producing comprising:

performing computational fluid dynamics modeling of the bounded domain to produce a model of the bounded domain, the performing including:

solving iteratively a computational fluid dynamics model of the bounded domain using mass flow boundary conditions that are specified, the solving comprising automatically adjusting the mass flow boundary conditions for at least one iteration of the solving, the automatically adjusting comprising mass balancing flows at a boundary of the bounded domain, wherein the mass balancing comprises applying different corrections to mass in-flows across the boundary into the bounded domain compared with mass out-flows across the boundary from the bounded domain; and the producing including using the model in providing the data center layout optimized for energy efficiency of the data center, and configuring the data center based on the data center layout.

2. The method of claim 1, further comprising using results of the solving to automatically reconfigure or adjust one or more features of the bounded domain.

3. The method of claim 1, wherein the mass balancing comprises, for at least one automatic adjusting of the mass flow boundary conditions, multiplying any mass in-flow across the boundary by (1−CF), and multiplying any mass out-flow across the boundary by (1+CF), where CF is a determined correction factor, and net mass flow is positive for mass out-flow exiting the bounded domain, and negative for mass in-flow entering the bounded domain.

4. The method of claim 3, wherein for one automatic adjusting of the at least one automatic adjusting, the determined correction factor comprises net mass in-flow into the bounded domain across the boundary divided by total mass flow crossing the boundary of the bounded domain.

5. The method of claim 1, wherein the mass balancing further comprises, for at least one automatic adjusting of the mass flow boundary conditions, using a zero-finding algorithm to update the mass flow boundary conditions for use in the at least one solving iteration of the computational fluid dynamics model.

6. The method of claim 1, wherein the mass balancing comprises automatically determining a current mass imbalance ratio and ascertaining whether the current mass imbalance ratio is less than or equal to a defined maximum allowable mass imbalance ratio, and terminating the mass balancing where the current mass imbalance ratio is less than or equal to the defined maximum allowable mass imbalance ratio.

7. The method of claim 1, wherein the performing computational fluid dynamics modeling of the bounded domain further comprises processing the bounded domain to automatically locate within the bounded domain at least one viscous region and at least one inviscid region, and wherein the solving comprises separately evaluating the at least one viscous region and the at least one inviscid region by iteratively performing:

viscous domain solve for the at least one viscous region using viscous mass flow boundary conditions that are specified for a viscous solve boundary associated with the at least one viscous region; and inviscid domain solve for the at least one inviscid region using inviscid mass flow boundary conditions that are specified for an inviscid solve boundary associated with the at least one inviscid region; and wherein the separately evaluating comprises separately automatically adjusting the viscous mass flow boundary conditions and the inviscid mass flow boundary conditions for the viscous domain solve and the inviscid domain solve, respectively, for at least one viscous domain solve iteration, and at least one inviscid domain solve iteration.

8. The method of claim 7, wherein the mass balancing comprises, for at least one automatic adjusting of the viscous mass flow boundary conditions, multiplying any mass in-flow across the viscous solve boundary by $(1-CF_v)$, and multiplying any mass out-flow across the viscous solve boundary by $(1+CF_v)$, where $CF_v$ is a determined viscous solve correction factor, and net mass flow is positive for mass out-flow exiting the at least one viscous region, and negative for mass in-flow entering the at least one viscous region, and the mass balancing comprises, for at least one automatic adjusting of the inviscid mass flow boundary conditions, multiplying any mass in-flow across the inviscid solve boundary by $(1-CF_{in})$, and multiplying any mass out-flow across the inviscid solve boundary by $(1+CF_{in})$, where $CF_{in}$ is a determined inviscid solve correction factor, and net mass flow is positive for mass out-flow exiting the at least one inviscid region, and negative for mass in-flow entering the at least one inviscid region.

9. The method of claim 8, wherein for one automatic adjusting of the at least one automatic adjusting of the viscous mass flow boundary conditions, the determined viscous solve correction factor $CF_v$ comprises net mass in-flow into the at least one viscous region across the viscous solve boundary divided by total mass flow crossing the viscous solve boundary of the at least one viscous region, and wherein for one automatic adjusting of the at least one automatic adjusting of the inviscid mass flow boundary conditions, the determined inviscid solve correction factor $CF_{in}$ comprises net mass in-flow across the inviscid solve boundary divided by total mass flow crossing the inviscid solve boundary of the at least one inviscid region.

\* \* \* \* \*